(12) United States Patent
Lee

(10) Patent No.: US 12,506,722 B2
(45) Date of Patent: Dec. 23, 2025

(54) METHOD, DEVICE AND COMPUTER PROGRAM FOR CLOUD-AUTHENTICATED PAIRING IN WIRELESS COMMUNICATION SYSTEM, AND RECORDING MEDIUM THEREFOR

(71) Applicant: INTELLECTUAL DISCOVERY CO., LTD., Seoul (KR)

(72) Inventor: Jea Ho Lee, Cheongju-si (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 151 days.

(21) Appl. No.: 17/904,101

(22) PCT Filed: Feb. 4, 2021

(86) PCT No.: PCT/KR2021/001452
§ 371 (c)(1),
(2) Date: Aug. 11, 2022

(87) PCT Pub. No.: WO2021/162335
PCT Pub. Date: Aug. 19, 2021

(65) Prior Publication Data
US 2023/0080122 A1    Mar. 16, 2023

(30) Foreign Application Priority Data
Feb. 14, 2020    (KR) .......................... 10-2020-0018127

(51) Int. Cl.
*H04L 9/40*    (2022.01)
*H04L 67/141*    (2022.01)

(52) U.S. Cl.
CPC ............ *H04L 63/08* (2013.01); *H04L 67/141* (2013.01)

(58) Field of Classification Search
CPC ...... H04L 63/08; H04L 67/141; H04W 12/50; H04W 4/80; H04W 12/06; Y02D 30/70
See application file for complete search history.

(56) References Cited

U.S. PATENT DOCUMENTS 8,744,804 B2 *    6/2014    Messenger ............. G06Q 30/02
                                                    702/160
9,949,065 B1 *    4/2018    Zarakas .............. H04L 63/0876
(Continued)

FOREIGN PATENT DOCUMENTS

| EP | 2849066 A1 | 3/2015 |
|---|---|---|
| KR | 10-2012-0028907 A | 3/2012 |
| KR | 10-2018-0131586 A | 12/2018 |

OTHER PUBLICATIONS

Extended European Search Report for EP 21753878.4 by European Patent Office dated Feb. 5, 2024.
(Continued)

*Primary Examiner* — Thomas A Gyorfi
(74) *Attorney, Agent, or Firm* — BROADVIEW IP LAW, PC

(57) ABSTRACT

The present disclosure relates to a method, device and computer program for cloud-authenticated pairing in a wireless communication system, and a recording medium therefor. A method for carrying out account-based pairing in a wireless communication system, according to one embodiment of the present disclosure, may comprise the steps in which: a seeker device acquires credential information of a provider device from a server; the seeker device acquires, from the provider device, an advertising packet comprising a hash value which is based on the credential information; and the seeker device establishes a connection with the provider device on the basis of the acquired credential
(Continued)

information and the hash value which is based on the acquired credential information.

9 Claims, 28 Drawing Sheets

(56) References Cited

U.S. PATENT DOCUMENTS

| | | | | |
|---|---|---|---|---|
| 2014/0293978 A1* | 10/2014 | Yang | ........................ | H04L 67/51 |
| | | | | 370/338 |
| 2015/0199863 A1* | 7/2015 | Scoggins | ................. | G07C 9/28 |
| | | | | 340/5.25 |
| 2015/0242601 A1* | 8/2015 | Griffiths | ................ | H04L 63/105 |
| | | | | 726/5 |
| 2015/0257188 A1* | 9/2015 | Patil | ........................ | H04W 4/08 |
| | | | | 455/41.1 |
| 2016/0234220 A1 | 8/2016 | Wolman et al. | | |
| 2016/0234221 A1* | 8/2016 | Junuzovic | ............. | H04L 63/102 |
| 2016/0248746 A1 | 8/2016 | James et al. | | |
| 2017/0026778 A1* | 1/2017 | Yamada | ................ | H04W 12/08 |
| 2017/0118645 A1 | 4/2017 | Zarakas et al. | | |
| 2018/0206279 A1* | 7/2018 | Lee | ........................ | H04W 76/14 |
| 2018/0309721 A1 | 10/2018 | Ashley et al. | | |
| 2019/0098006 A1 | 3/2019 | Kim et al. | | |

OTHER PUBLICATIONS

International Search Report for PCT/KR2021/001452 by Korean Intellectual Property Office dated May 27, 2021.
Office Action for KR 10-2022-7027724 by Korean Intellectual Property Office dated Jul. 10, 2025.

* cited by examiner (a)

(b)

METHOD, DEVICE AND COMPUTER PROGRAM FOR CLOUD-AUTHENTICATED PAIRING IN WIRELESS COMMUNICATION SYSTEM, AND RECORDING MEDIUM THEREFOR

CROSS-REFERENCE TO RELATED APPLICATIONS

This application is a National Phase Entry Application of PCT Application No. PCT/KR2021/001452 filed on Feb. 4, 2021, which claims priority to Korean Patent Application No. 10-2020-0018127 filed on Feb. 14, 2020, in Korean Intellectual Property Office, the entire contents of which are hereby incorporated by reference in its entirety.

TECHNICAL FIELD

The present disclosure relates to a cloud authentication pairing method, an apparatus, a computer program, and a recording medium thereof in a wireless communication system.

BACKGROUND

Bluetooth is a short-range wireless communication standard and includes BR (Basic Rate)/EDR (Enhanced Data Rate) technology and LE (Low Energy) technology. BR/EDR is also called Bluetooth classic, and includes BR technology applied from Bluetooth 1.0 and EDR technology applied from Bluetooth 2.0. Bluetooth LE (BLE) applied after Bluetooth 4.0 is a technology that supports transmission and reception of relatively large data with low power consumption.

The Bluetooth standard includes various profiles. For example, the Hands-Free Profile (HFP) defines what is necessary for one device to function as an audio gateway (AG) such as a smartphone and another device to function as a hands-free device such as a headset. In addition, A2DP (Advance Audio Distribution Profile) defines what is necessary for one device to function as an audio source such as a music player and another device to function as an audio sink such as a speaker.

As the spread of wireless devices increases recently, the demand for transmitting and receiving audio data in various topologies of many-to-many or M-to-N connection types is increasing. For example, streaming services that require a 5.1 channel environment are emerging, and it is being discussed to support a 5.1 channel environment using a plurality of Bluetooth portable speakers, breaking away from the limitations of a conventional 5.1 channel dedicated wired speaker. However, since the conventional Bluetooth audio technology was mainly developed in consideration of a use case of a one-to-one connection between two devices, it is not suitable for supporting audio data transmission/reception between multiple devices and delay is a big problem. In addition, as the number of Bluetooth audio devices increases, there is a problem in that power consumption for searching for peripheral devices increases.

There is no method for providing automatic authentication for pairing with a new device in the conventional Bluetooth system.

Meanwhile, in the conventional Bluetooth system, a method for providing integrated synchronization in recording media (audio and/or video) in each of a plurality of devices is not provided.

DISCLOSURE

Technical Problem

A technical problem of the present disclosure is to provide an automatic authentication method for a new pairing target device in a wireless communication system.

A further technical problem of the present disclosure is to provide an integrated synchronization method in media recording in each of a plurality of devices in a wireless communication system.

The technical problems to be achieved in the present disclosure are not limited to the technical problems mentioned above, and other technical problems not mentioned will be clearly understood by those of ordinary skill in the art to which the present disclosure belongs from the following description.

Technical Solution

A method of performing account-based pairing in a wireless communication system according to an aspect of the present disclosure may include obtaining, by a seeker device, credential information on a provider device from a server; obtaining, by the seeker device, an advertising packet including a hash value based on credential information from the provider device; and establishing, by the seeker device, a connection with the provider device based on the obtained credential information and the hash value based on the obtained credential information.

An apparatus on a seeker device side for performing account-based pairing in a wireless communication system according to an additional aspect of the present disclosure my include a transceiver for performing signal transmission and reception with another apparatus; and a processor for controlling the transceiver and the apparatus, and the processor may be configured to: obtain, by a seeker device, credential information on a provider device from a server; obtain, by the seeker device, an advertising packet including a hash value based on credential information from the provider device; and establish, by the seeker device, a connection with the provider device based on the obtained credential information and the hash value based on the obtained credential information.

The features briefly summarized above with respect to the present disclosure are merely exemplary aspects of the detailed description of the present disclosure that follows, and do not limit the scope of the present disclosure.

Technical Effects

According to the present disclosure, an object of the present disclosure is to provide an automatic authentication method for a new pairing target device in a wireless communication system.

According to the present disclosure, an integrated synchronization method in media recording in each of a plurality of devices in a wireless communication system may be provided.

The technical effects of the present disclosure are not limited to the above-described effects, and other effects not mentioned herein may be understood to those skilled in the art from the following description.

BEST MODE

Figure 1:
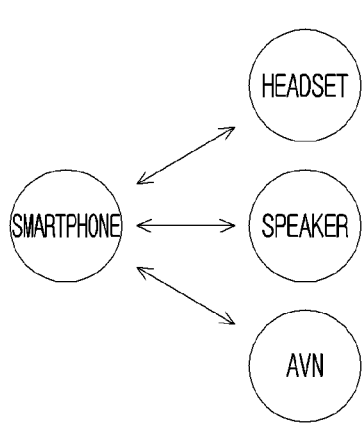
FIG. 1 is a diagram exemplarily illustrating a conventional audio connection type and an audio connection type to which the present disclosure is applicable.
Figure 1:
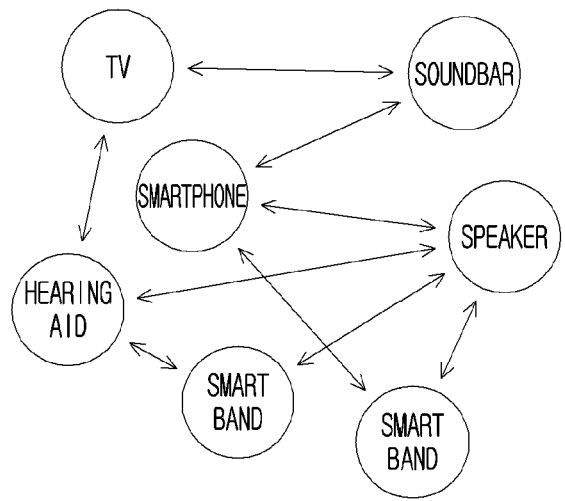

Hereinafter, with reference to the accompanying drawings, embodiment of the present disclosure will be described in detail so that those of ordinary skill in the art to which the present disclosure belongs can easily implement them. However, the present disclosure may be embodied in several different forms and is not limited to the embodiments described herein.

In describing the embodiments of the present disclosure, if it is determined that a detailed description of a well-known configuration or function may obscure the gist of the present disclosure, a detailed description thereof will be omitted. And, in the drawings, parts not related to the description of the present disclosure are omitted, and similar reference numerals are attached to similar parts.

In the present disclosure, when a component is "connected", "coupled" or "accessed" to another component, it may include not only a direct connection relationship, but also an indirect connection relationship in which another component exists in the middle. Also, in the present disclosure, the terms "comprises" or "have" specify the presence of a recited feature, step, operation, element and/or component, but it does not exclude the presence or addition of one or more other features, steps, operations, elements, components, and/or groups thereof.

In the present disclosure, terms such as "first" and "second" are used only for the purpose of distinguishing one component from other components and are not used to limit the components. And, unless otherwise noted, the terms do not limit the order or importance between the components. Accordingly, within the scope of the present disclosure, a first component in one embodiment may be referred to as a second component in another embodiment, and similarly, a second component in one embodiment may be referred to as a first component in another embodiment.

In the present disclosure, the components that are distinguished from each other are for clearly describing each characteristic, and do not necessarily mean that the components are separated. That is, a plurality of components may be integrated to form one hardware unit or a software unit, or one component may be distributed to form a plurality of hardware units or software units. Accordingly, even if not specifically mentioned, such integrated or dispersed embodiments are also included in the scope of the present disclosure.

The various embodiments of the present disclosure are not intended to list all possible combinations of components, but rather to illustrate representative aspects of the disclosure, and some or all of the components described in the various embodiments may be applied independently or in combination of two or more. That is, components described in various embodiments of the present disclosure do not necessarily mean essential components, and some may be optional components. Accordingly, an embodiment composed of a subset of components described in one embodiment is also included in the scope of the present disclosure. In addition, embodiments including other components in addition to components described in various embodiments are also included in the scope of the present disclosure.

Example methods of the present disclosure are expressed as a series of operations for clarity of description, but this is not intended to limit the order in which the steps are performed, and if necessary, each step may be performed simultaneously or in a different order. In addition, in order to implement the method according to the present disclosure, other steps may be included in addition to the illustrated steps, steps may be included except for some steps, or additional steps may be included except for some steps.

Terms used in the present disclosure is for the description of specific embodiments and is not intended to limit the claims. As used in the description of the embodiments and in the appended claims, the singular form is intended to include the plural form as well, unless the context clearly dictates otherwise. Also, the term "and/or" used in the present disclosure may refer to one of the related enumerations, or is meant to refer to and include all possible (or random) combinations of two or more thereof.

Definitions of terms used in the present disclosure are as follows.

An audio sink is an entity that receives audio data from an audio source.

An audio source is an entity that transmits audio data to the audio sink.

An audio channel is a single flow of coded or uncoded audio data.

An audio stream is a unidirectional logical communication channel that carries audio data flowing from the audio source to the audio sink. Audio data may flow on an audio stream session (ASS). An audio stream may carry audio data for one or more audio channels.

An audio group may include one or more synchronized audio streams.

A content type indicates a classification of content of an audio group. The classification may include whether the audio was initiated by the user. A content type indicates a classification of content of an audio group. The classification may include whether the audio was initiated by the user. Examples of the content type may include uncategorized audio (UncategorizedAudio), ringtone (Ringtone), system sound (SystemSound), satellite navigation (Satnav), call audio (CallAudio), media (Media), and the like.

Metadata is a variable-length data that describes and provides the context of audio data. Metadata may be defined for a higher layer.

An audio stream session (ASS) means to a unidirectional or bidirectional transmission/exchange process of an audio stream. An endpoint of an ASS corresponds to an audio input and/or audio output of an audio stream session, and may correspond to one device or a group of devices. The end of the ASS resides on the server and may be configured by the server or by the client. The server may store, change, and manage ASS state.

QoS (Quality of Service) means a quality of service for an audio stream and may correspond to a requirement for a specific service.

An audio location means a logical spatial rendering location intended for an audio channel within a spatial arrangement of a device for rendering audio. For example, the left and right location of a headset may correspond to an audio location. An audio location may be allocated to an audio channel.

CBIS (Connection Based Isochronous Stream) is a term defined in a core layer and is a concept corresponding to an audio stream in an ASS service. A unidirectional CBIS may have one audio stream, and a bidirectional CBIS may have two audio streams.

CBISS (Connection Based Isochronous Stream Set) is a term defined in a core layer and is a concept corresponding to an audio group in the ASS service.

An audio scene application (ASA) means an audio group performing a specific content type.

ASC (Audio Steam Capability) is a set of parameters necessary for configuring an audio session capability.

An audio advertisement is to discover the availability of ASA participation. An audio general advertisement is an audio advertisement that does not specify a target, and an audio directed advertisement is an audio advertisement for a specific target.

Isochronous data means data that is limited by time. For example, isochronous data may be time-dependent audio, such as television audio that needs to be synchronized with respect to an image of a video, or audio that needs to be synchronized and reproduced in multiple devices constituting a multi-channel.

An isochronous channel means a logical transmitting end used to transmit isochronous data from a transmitting device to one or more receiving devices.

An isochronous stream means a logical link carrying one or more isochronous channels.

FIG. 1 is a diagram exemplarily illustrating a conventional audio connection type and an audio connection type to which the present disclosure is applicable.

FIG. 1(a) illustrates an example of a BR/EDR audio connection type. In the case of BR/EDR, one-to-one connection type is supported. One device (e.g., a smartphone) may function as a central device, and may be connected one-to-one with each of several devices. That is, there may be multiple one-to-one connections. Accordingly, the service such as a phone call through a headset or music reproduction through a speaker may be supported. The center of service in this connection type is an audio source, and an audio sink such as a headset, a speaker, and AVN (Audio Video Navigation) may operate as a peripheral device of the audio source.

FIG. 1(b) illustrates an example of a BLE audio connection type. In the case of BLE, many-to-many connections may be supported. In this case, there may be a plurality of center devices such as a TV, a smart phone, and a gateway etc., and complex M-to-N connection may be configured. Accordingly, services of phone calls and music reproduction through the headset may be supported, and broadcast audio services such as alarms, doorbells, and advertising voices may be supported. The center of the service in this connection type is an audio sink, and the audio service may be used by moving multiple audio sources.

Figure 2:
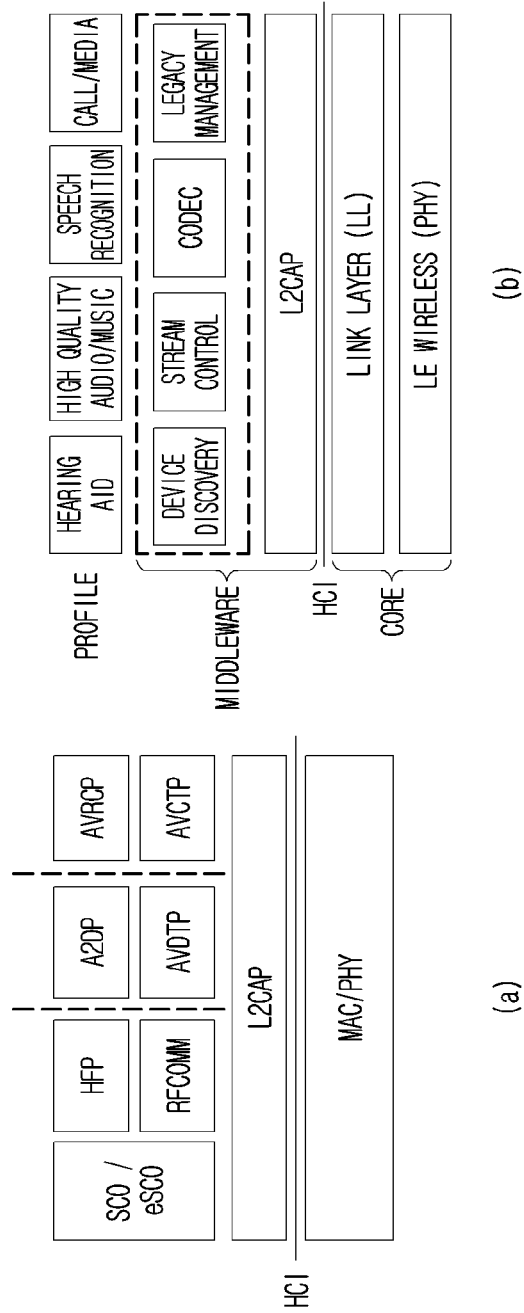
FIG. 2 is a diagram exemplarily illustrating a conventional audio-related protocol and an audio-related protocol stack to which the present is applicable.

FIG. 2 is a diagram exemplarily illustrating a conventional audio-related protocol stack and an audio-related protocol stack to which the present disclosure is applicable.

FIG. 2(a) illustrates an example of an audio-related protocol stack. L2CAP (Logical Link Control & Adaption Protocol) layer functions as arbitration and mediation between the upper layer and the lower layer. In the upper layer, protocols such as RFCOMM (Radio Frequency Communication), AVDTP (Audio/Video Distribution Transport Protocol), AVCTP (Audio/Video Control Transport Protocol) etc. and profiles such as HFP (Hands Free Profile), A2DP (Advanced Audio Distribution Profile), AVRCP (Audio/Video Remote Control Profile) etc. may be included. The lower layer may include a MAC/PHY layer. The MAC (Medium Access Control) layer may include a link manager and a link controller, and the PHY (Physical) layer may include a BR/EDR radio. In addition, Synchronous Connection Oriented (SCO)/extended SCO (eSCO) may provide a synchronous data communication path for voice. As such, in BR/EDR, a protocol stack may be designed for each profile. The L2CAP layer, the BR/EDR protocol, the Generic Access Profile (GAP), and the BR/EDR profile layer may be collectively referred to as the host layer, and the link manager, link controller, and BR/EDR radio layer may be referred to as the controller layer. The interface between the host and the controller may be referred to as a HCI (Host Controller Interface).

FIG. 2(b) illustrates an example of a BLE audio-related protocol stack. Unlike BR/EDR in which protocols are configured for each profile, in BLE, a common protocol stack for various profiles may be designed. This common protocol stack may be referred to as middleware. For example, a common protocol for various profiles such as hearing aids, high quality audio/music, voice recognition, and call/media in the form of middleware may be configured. For example, the middleware may include protocols such as device discovery, stream control (or stream management), codec, and legacy management. In addition, the core layer may include a link layer (Link Layer, LL), an LE Radio (i.e., a PHY layer), and the LL may include functions related to multicast support isochronous channels defined from Bluetooth 5.

In addition, the profile and middleware may be referred to as a host layer, the core layer may be referred to as a controller layer, and HCI may be defined between the host and the controller.

In addition to the host profile and protocol illustrated in FIG. 2(b), the host may include an LE profile, a generic access profile (GAP), a generic attribute profile (GATT), an Attribute (ATT) protocol, a security manager (SM), and the like.

Information transmitted from a host to a controller may be referred to as a HCI command packet. Information transmitted from a controller to a host may be referred to as a HCI event packet. In addition, HCI asynchronous data packets or HCI synchronous data packets may be exchanged between a host and a controller.

Also, in addition to the middleware profiles and services illustrated in FIG. 2(b), the middleware may include various profiles and/or services as follows:

Audio Session Capability Service (ASCS): Audio Session Capability Service (ASCS) is a service that supports to advertise or discover capabilities related to an audio session;

Audio Stream Session Service (Audio Stream Session Service, ASSS): Audio Stream Session Service (ASSS) is a service that supports discovery, setup, establishment, control, and management related to an audio session;

Audio Input Management Service (AIMS): a service for managing audio input volume, etc.;

Audio Routing Service (ARS): a service for selecting the location of audio inputs and outputs;

Audio Middleware Profile (AMP): a basic profile for the behavior of a device to distribute audio;

Call Management Profile (CMP): a profile of the roles and procedures of interaction between two devices for a call;

Audio General Middleware Profile (AGMP): a basic profile that enables content and/or stream control;

Group Identification Service (GIS): a service for the discovery of devices belonging to a group. A Group Identification Service (GIS) or Group Identification Profile (GIP) may allow devices to be discovered as part of a group. A group is defined as a group of devices that operate together to support a specific scenario, and these devices may be referred to as group members. For example, a group of devices that respond to a control command together, such as a pair of hearing aids, a pair of earbuds, or a set of speakers that receive multichannel (e.g., 5.1 CH) audio, may be such examples:

Audio Player Management Profile (APMP): a profile that supports the control or interaction of an audio player;

Audio Player Management Service (APMS): a service that supports the control or interaction of an audio player;

Microphone Management Profile: a profile for microphone state management;

Microphone Management Service: a service that supports interfaces and states for microphone state management;

Quick Service Discovery Service (QSDS): a service that supports quick discovery of services such as audio player management and call management;

Call Bearer Service: a service that supports management of a call interface and a call state for a bearer on a device;

Volume Management Profile: a profile that supports audio volume management of a device;

Volume Management Service: a service that supports the device's audio volume interface and state;

Volume Offset Management Service: a service for volume management for audio output.

Figure 3:
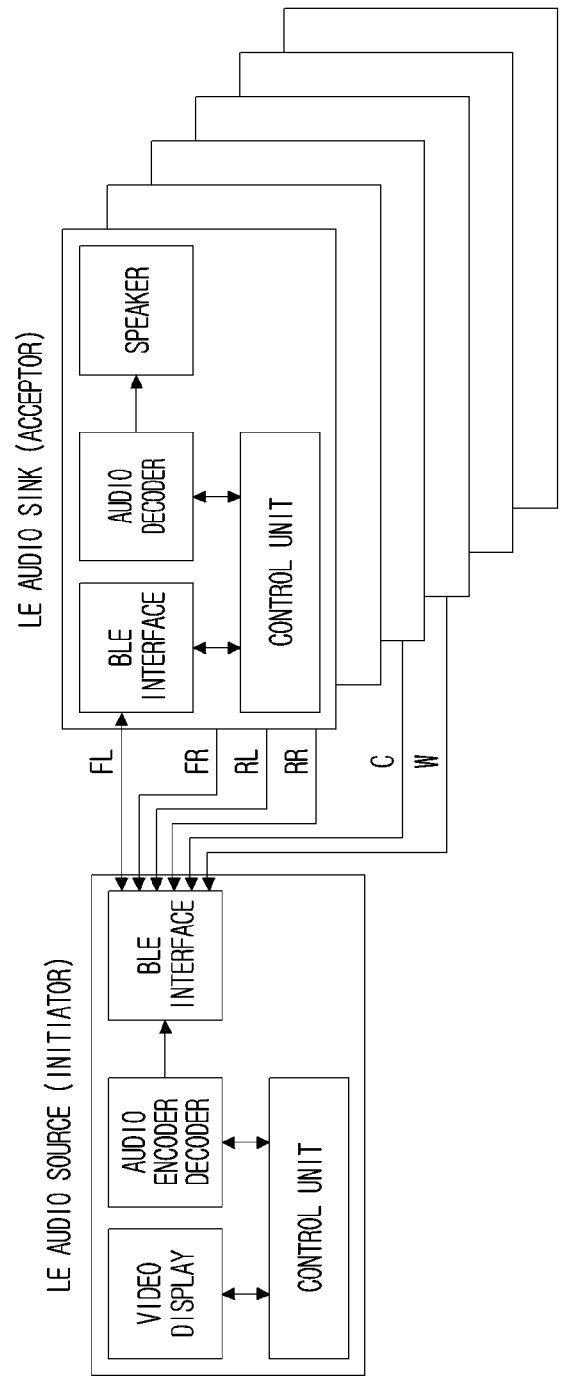
FIG. 3 is a diagram illustrating examples of 5.1 channel surround system hardware to which the present disclosure is applicable.

FIG. 3 illustrates examples of 5.1 channel surround system hardware to which the present disclosure is applicable.

In FIG. 3, a LE audio source device may perform a function of an initiator, and a LE audio sink device may perform a function of an acceptor. The initiator means a device that initiates an audio session, and the acceptor means a device that accepts the initiation of an audio session. Here, a source is not always the initiator or a sink is not always the acceptor, and the source may be the acceptor or the sink may be the initiator.

For example, an audio source may be a TV device, and an audio sink may be a speaker device. The audio source may transmit audio data to the audio sink. In addition, the audio source may receive feedback data from the audio sink. A plurality of audio sinks may receive audio data corresponding to one of 5.1 channels, respectively, FL (Front Left), FR (Front Right), RL (Rear Left), RR (Rear Right), C (Center), and W (Woofer) and output it through the speaker.

An audio encoder or decoder may support various audio formats. For example, the audio format may include Bluetooth Low Energy Audio Codec (BLEAC), Dolby 5.1 CH, Digital Surround Sound (DTS), and the like, and the characteristics of each format are as follows. BLEAC is a mono codec, and the 96 kbps transmission rate of BLEAC may provide the same quality as 256 kbps of SBC (Sub-Band Codec) and 200 kbps of MP3. Dolby 5.1 CH may support a 48 kHz sampling rate, support 1 to 5.1 (or 1 to 6) channels and support a transmission rate of up to 448 kbps. DTS may support 48 kHz or 96 kHz sampling rate, support 2 to 6.1 channels, and support transmission rates of 768 kbps half rate and 1,536 kbps full rate.

Figure 4:
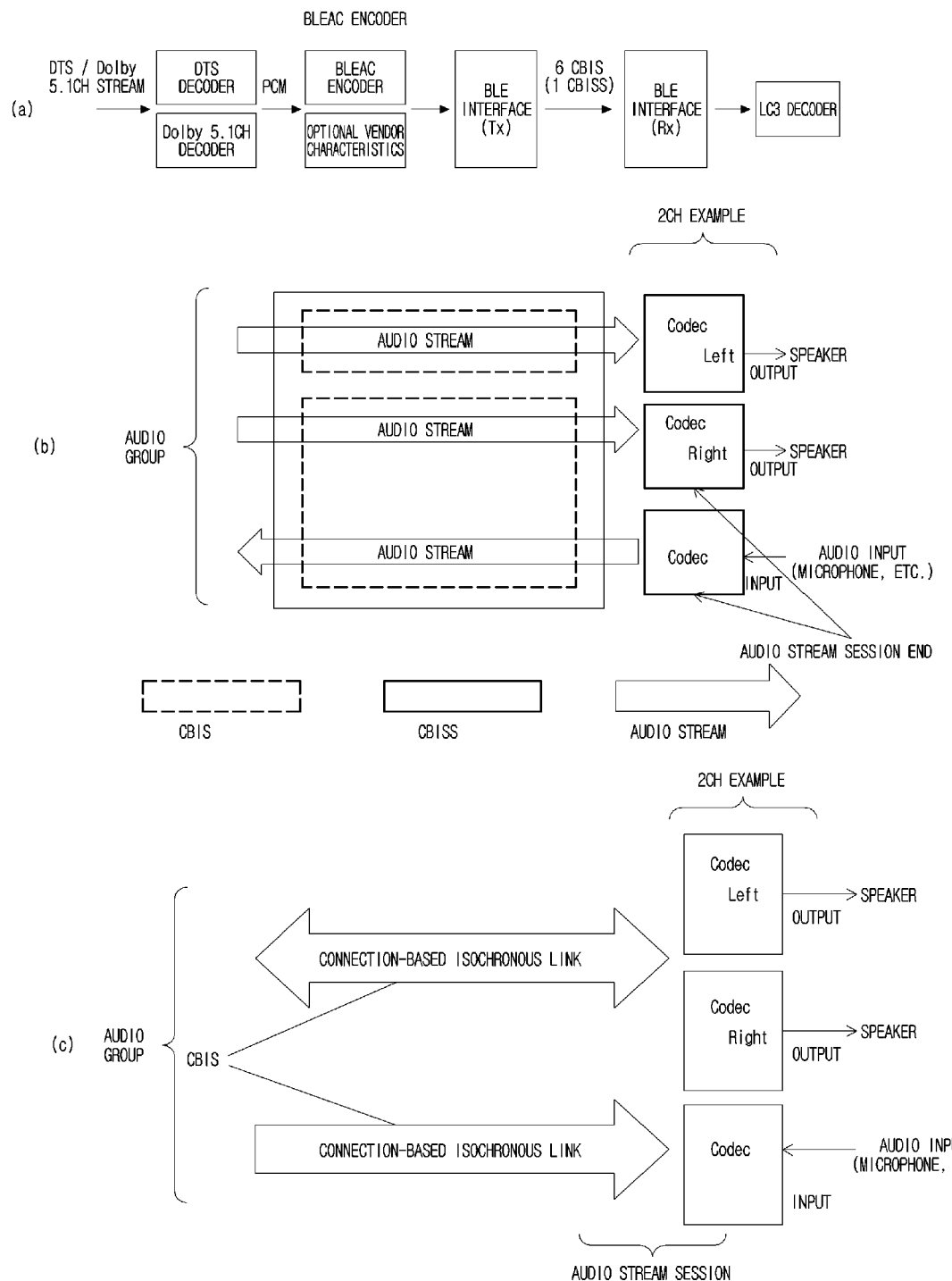
FIG. 4 is a diagram illustrating an audio data encoding/decoding process to which the present disclosure is applicable.

FIG. 4 is a diagram illustrating an audio data encoding/decoding process to which the present disclosure is applicable.

Referring to FIG. 4(a), a DTS format stream or a Dolby 5.1 CH format stream may be input to a DTS decoder or a Dolby 5.1 CH decoder of the transmitting end (Tx) and an audio signal in a PCM (Pulse-Code Modulation) format may be output. The PCM signal may be input to the BLEAC encoder and output as an audio signal in the BLEAC format. Here, optional vendor-specific information may be added. The BLEAC signal may be transmitted to the BLE interface of the receiving end (Rx) through the BLE interface. The receiving end may process the BLEAC signal through the BLEAC decoder and convert it into a signal that can be output through the speaker.

Here, a plurality of streams may be transmitted from a transmitting end to a pluarlity of receiving ends. For example, each of the plurality of streams may include an audio signal corresponding to one channel among 5.1 CHs. The plurality of streams may be received at different times from the plurality of receiving ends, but have isochronous properties that require play or rendering at the same time, and these streams may be called CBIS (Connection Based Isochronous Stream). That is, six CBISs corresponding to 5.1 CH may be transmitted from a transmitting end to a receiving end, and a set of these six CBISs may be referred to as one CBISS (Connection Based Isochronous Steam Set).

FIGS. 4(b) and 4(c) conceptually illustrates audio streaming through a plurality of streams. One or more audio streams may correspond to CBIS, and an audio group may correspond to CBISS. For example, one audio stream may correspond to one CBIS, and two or more audio streams may correspond to one CBIS. A plurality of CBISs may be included in one audio group or CBISS.

Figure 5:
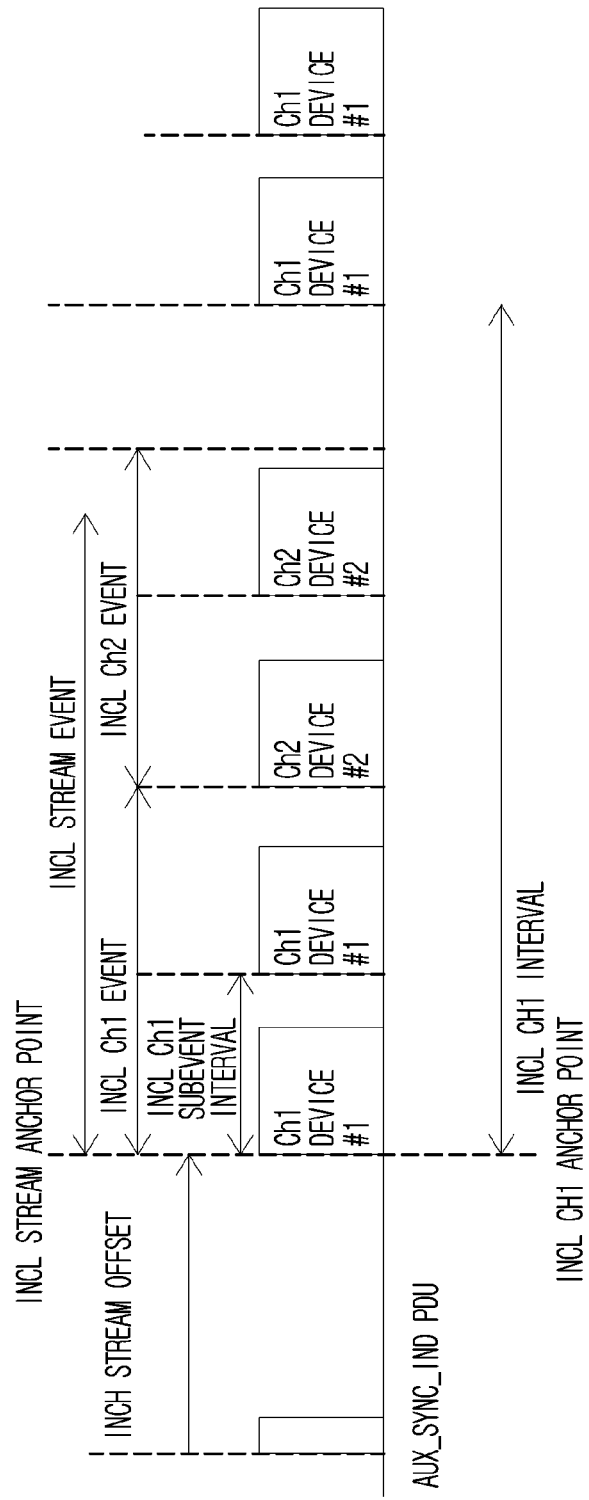
FIG. 5 is a diagram illustrating an example of channel allocation for two devices to which the present disclosure is applicable.

FIG. 5 is a diagram illustrating an example of channel allocation for two devices to which the present disclosure is applicable.

The receiving end may initiate stream reception according to timing information provided by the transmitting end. For example, the timing information may indicate a time point after a predetermined offset from a time point at which a data unit including the timing information is transmitted. The receiving end may receive audio data corresponding to one or more channels included in the stream. For example, a plurality of channels included in one stream may be allocated to a plurality of receiving ends, respectively. A plurality of channels (or a plurality of audio data) included in one stream may be transmitted in a time division multiplexing (TDM) method. For example, audio data of a first channel may be transmitted at a first timing, and audio data of a second channel may be transmitted at a second timing.

The broadcast receiving end may detect a currently obtainable broadcast audio stream, a stream offset value, a stream interval value, and the like, by using information included in a data unit periodically advertised by the transmitting end.

In the case of an Isochronous Non-Connection Link (INCL), which is a connectionless-based isochronous link, an isochronous channel may be transmitted/received (e.g., in a broadcast manner) without a connection between a source device and a sink device. From information such as BSG (Broadcast Synch Group) included in the AUX_SYNC_IND Protocol Data Unit (PDU) advertised by the transmitting end, the receiving end may check the INCL stream offset or BSG offset, and determine the anchor point timing. INCL stream transmission may start from the anchor point. A timing difference between two consecutive anchor points may be defined as an interval (e.g., an INCL CH1 interval or an ISO interval of FIG. 5). One or more sub-events may be included in the stream transmission event.

In the example of FIG. 5, one audio stream may include audio data for two channels. The first channel (CH1) may be allocated to the first device (device #1), and the second channel (CH2) may be allocated to the second device (device #2). At one or more timings after the anchor point, CH1 included in the INCL stream may be transmitted to the device #1, and thereafter, CH2 may be transmitted to the device #2 at one or more timings. In addition, the INCL stream event may include an event for CH1 and an event for CH2. An event for CH1 may include two sub-events. An event for CH2 may include two sub-events. A timing difference between sub-events may be defined as a sub-event interval.

Isochronous audio data may have a limited lifetime. That is, the audio data may be invalidated after the predetermined time has expired. For example, a predetermined timeout value may be defined in the ICL channel, and isochronous audio data transmitted to a plurality of devices may be discarded after the predetermined timeout value has expired. For example, a timeout may be expressed as a number of sub-events.

Figure 6:
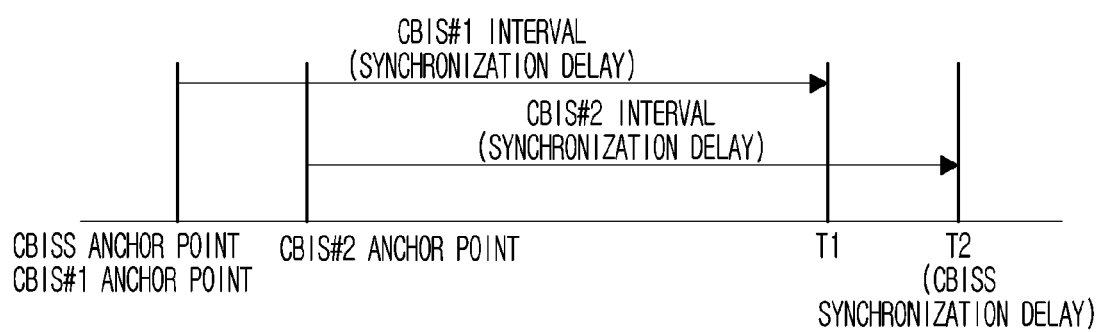
FIG. 6 is a diagram for describing a synchronization delay of two streams to which the present disclosure is applicable.

FIG. 6 is a diagram for describing a synchronization delay of two streams to which the present disclosure is applicable.

It is assumed that a pluarlity of streams are included in one audio group, and the plurality of streams have isochronism required to be reproduced at the same time. A plurality of streams may be transmitted from one device or may be transmitted from different devices. Also, the plurality of streams may be received by one device or may be received by different devices.

Since the Bluetooth communication method does not support simultaneous transmission of a plurality of streams, the plurality of streams may be transmitted in the TDM method on different time resources (or timings) according to a predetermined order. In this case, a difference may occur in the transmission timing of the plurality of streams, and accordingly, a difference may also occur in the reception timing of the plurality of streams. In addition, since a plurality of streams are required to be reproduced simultaneously, the stream received first cannot be reproduced first, but may be reproduced after waiting until the last stream is received. That is, a synchronization delay may occur until a timing at which reception of all streams is completed.

In the example of FIG. 6, the first stream (CBIS#1) and the second stream (CBIS#2) may be required to be reproduced simultaneously, and may be included in one CBISS. The CBISS anchor point may be same as the anchor point of CBIS#1, and after the CBIS#1 audio data may be transmitted, CBIS#1 audio data subsequent to the time point (e.g., T1) after the CBIS #1 interval may be transmitted. Next, after CBIS#2 audio data is transmitted from the anchor point of CBIS#2, CBIS#2 audio data subsequent to a time point after the CBIS#2 interval (e.g., T2) may be transmitted. After all streams included in one CBISS are received, they may be reproduced simultaneously. That is, the audio data of CBIS#1 and CBIS#2 may be processed and reproduced at the time of completion of reception of CBIS#2, which is transmitted relatively late.

Here, the synchronization delay of the CBISS may be defined as a time interval until the reception completion time (T2) of CBIS#2, which is received relatively late from the CBISS. For example, the later time point among the reception completion time T1 of CBIS#1 and the reception completion time T2 of CBIS#2 may be determined as the synchronization delay of the CBISS. That is, a later reception completion time among synchronization delays of a plurality of streams may be determined as a synchronization delay of the CBISS. Specifically, when CBIS#1 and CBIS#2 are bundled into the same single CBISS, the previously received stream CBIS#1 may be reproduced after waiting until the received stream CBIS#2 information is transmitted.

The transmitting end (Tx) may inform the receiving end (Rx) of an expected delay value calculated in consideration of the number of CBISs, CBIS events, sub-events, and intervals in advance. For example, the transmitting end may inform the receiving end of the expected delay value when configuring the channel.

In the case of a connection-based isochronous connection link (ICL), since the transmitting end and the receiving end are connected, the receiving end may inform the transmitting end of the actual delay value.

In the case of INCL, since the transmitting end and the receiving end are not connected, the receiving end cannot inform the transmitting end of the actual delay value. Even if the delay value may be informed from the receiving end to the transmitting end, the transmitting end cannot control the playback time of a specific device in order to synchronize the plurality of devices.

For example, even in the case of INCL, when a plurality of CBISs (e.g., six CBISs corresponding to six channels of 5.1 CH) are included in one CBISS, the transmitting end may receive feedback from the receiver to adjust synchronization. Through the feedback, the receiving end may inform the transmitting end of its delay information.

Figure 7:
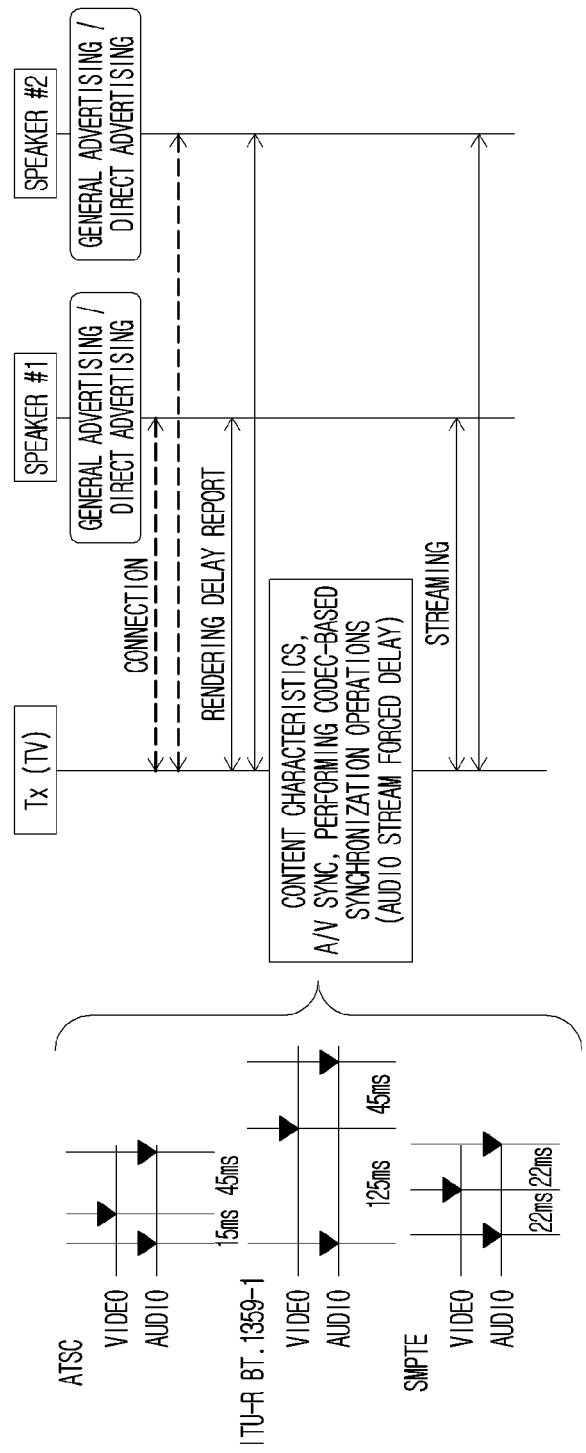
FIG. 7 is a diagram for describing a broadcast operation for a plurality of devices to which the present disclosure is applicable.

FIG. 7 is a diagram for describing a broadcast operation for a plurality of devices to which the present disclosure is applicable.

The audio source device may calculate a synchronization delay value for simultaneous reproduction of isochronous streams and transmit it to a plurality of audio sink devices. Each of the sink devices may determine the playback timing based on the delay value provided from the source device. That is, since the source device cannot accurately know the amount of time the sink device takes to receive and process audio data, the sink device may provide the delay value as basic information for determining the playback timing. The sink device may determine a reproduction timing according to its device characteristics and reproduce audio data.

For example, in an Isochronous Broadcast operation, a source device (e.g., a TV) may calculate a transmission delay, a rendering delay, etc., and transmit to a sink device (e.g., speaker). The sink device may adjust playback or rendering timing of audio data by reflecting the received delay value. Since device characteristics are different for each sink device manufacturer, the actual playback timing may be determined by the sink device.

If the sink device can transmit information to the source device, the sink, the sink device may calculate a delay value and transmit to the source device. Accordingly, the source device may determine the transmission timing based on the delay value provided from the sink device.

For example, a feedback channel may be formed through which a sink device (e.g., a speaker) may communicate information to a source device (e.g., a TV). In this case, a unicast operation based on an isochronous connection may be performed. The sink device may calculate a rendering delay value and transmit it to the source device through a feedback channel. Accordingly, the source device may adjust the transmission time of the audio data by reflecting the delay value provided from the sink device.

Referring to FIG. 7, an isochronous stream operation is exemplarily illustrated in the case where a transmitting end is a TV, and two receiving ends are a first speaker (speaker #1) and a second speaker (speaker #2). The first speaker may be allocated a first stream/channel (e.g., RR channel in 5.1 CH), and the second speaker may be allocated a second stream/channel (e.g., RL channel in 5.1 CH).

The first and second speakers may transmit an audio general advertisement or an audio directed advertisement, respectively. At least one of the TV and the first speaker or the second speaker may or may not be connected to each other.

When at least one of the TV and the speaker is connected, the speaker may calculate a rendering delay value and report it to the TV. When the TV and the speaker are not connected, the TV may calculate the transmission delay, rendering delay value, and the like, and send it to the speaker.

The TV may perform a synchronization operation in consideration of audio content characteristics, audio/video synch, codec characteristics, and the like, and forcibly apply a delay to a specific audio stream. For example, since the audio codec encoding/decoding delay is different from 40 ms for BLEAC, 200 ms for SBC, 100 ms for APT-X, etc., the delay value may be determined according to codec characteristics. In addition, since characteristics of A/V content are different according to games, movies, animations, and the like, a delay value may be determined in consideration of this. Also, a delay value may be determined in consideration of a difference between a media clock and a clock of the BLE interface. The media clock may be confirmed through A/V time scale information.

In addition, as shown on the left side of FIG. 7, a delay value may be determined in consideration of audio/video signal processing time defined in various broadcasting standards. For example, the time interval between audio-video-audio is 15 ms and 45 ms in Advanced Television Systems Committee (ATSC), 125 ms and 45 ms in ITU-R BT.1359-1, and SMPTE (Society of Motion Picture and Television Engineers) It is defined as 22 ms and 22 ms, and a delay value may be determined in consideration of these time intervals.

The TV may configure the rendering delay value of each stream and inform the speaker, or determine the transmission timing of the stream based on the delay value provided from the speaker.

The TV may transmit a stream to the speaker based on the determined delay value. That is, the source device or the TV which is the transmitting end may exchange a delay value with the sink device and the speaker(s) which is the receiving end, and may perform an operation of synchronizing by reflecting the delay value.

Figure 8:
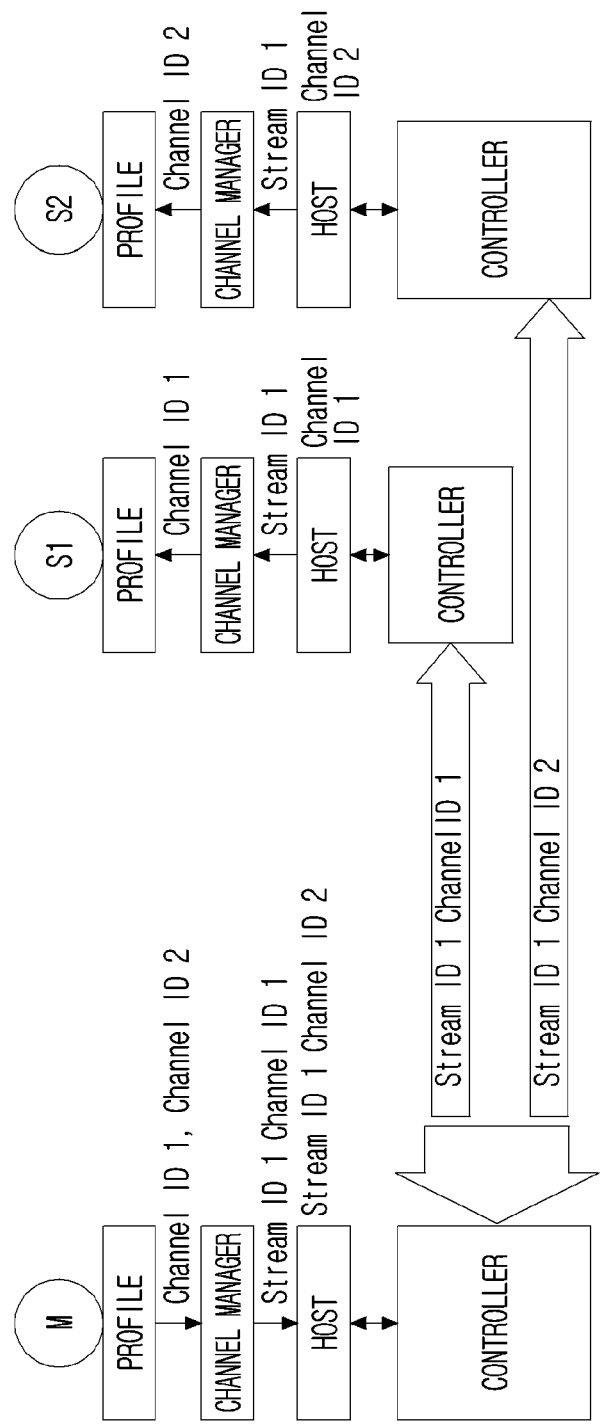
FIG. 8 and FIG. 9 are diagrams for describing the operation of the ICL type and the INCL type to which the present disclosure is applicable.
Figure 9:
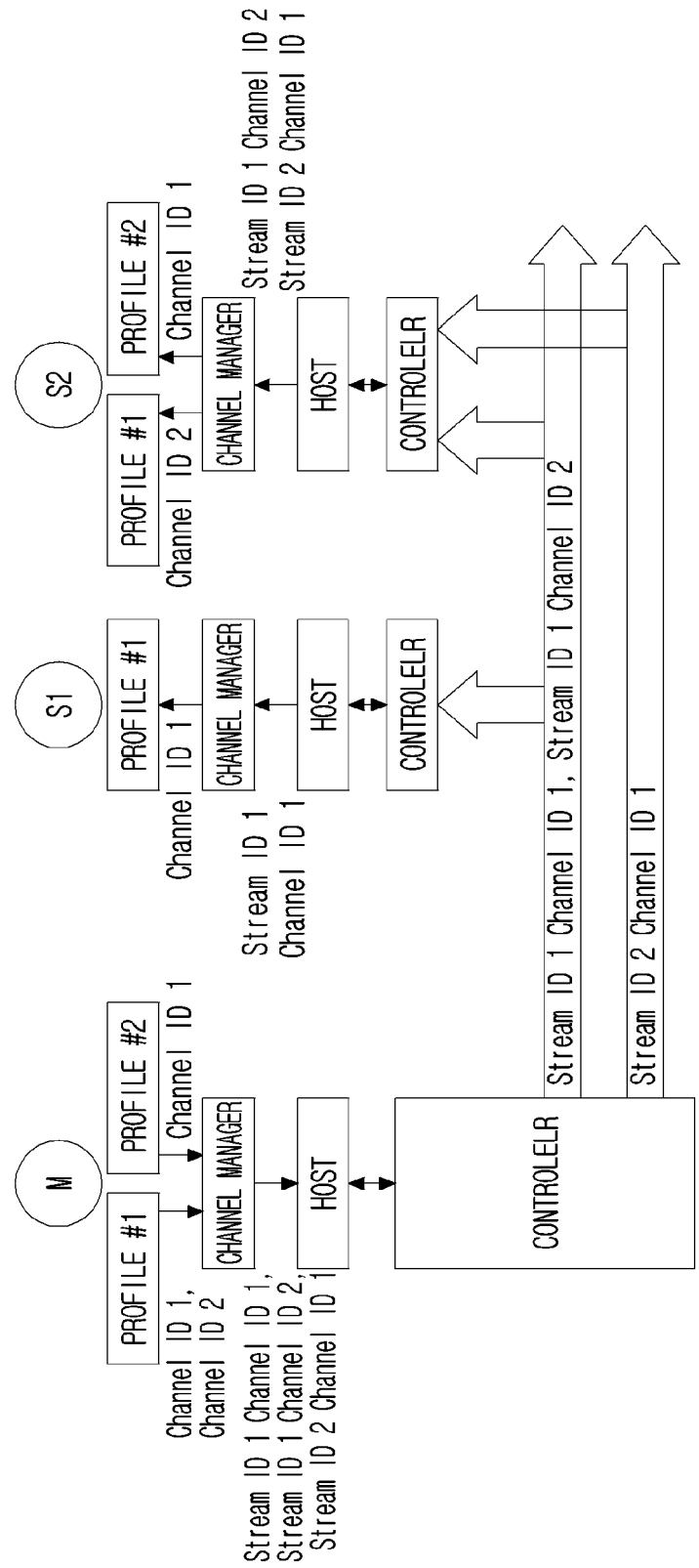

FIG. 8 and FIG. 9 are diagrams for describing the operation of a ICL type and a INCL type to which the present disclosure is applicable.

In BLE, a channel for audio transmission may be classified into an ICL type and an INCL type. Both the ICL channel and the INCL channel may transmit audio data to multiple devices and/or multiple profiles using a stream ID and a channel ID. According to the ICL type and the INCL type, it may be determined what operation is to be performed on the BLE channel for audio data transmission.

ICL channels correspond to a connection-based use case that supports unidirectional or bidirectional communication through a point-to-point physical link between one source device and one sink device. In addition, INCL channels correspond to a broadcast use case that supports only unidirectional communication through a point-to-multipoint physical link between one source device and one or more sink devices.

The protocol stack of the device may include a profile layer, a channel manager layer, a host layer, and a controller layer in order from an upper layer to a lower layer. Data may be transferred between the profile layer and the channel manager layer in units of channels, and data may be transferred between the channel manager layer and the host layer in units of streams.

Referring to FIG. 8, in case of the ICL type, a connection between a master (M) and the first slave S1 and a connection between the master M and the second slave S2. In this case, it is possible to divide two channels included in one stream by a channel identifier and transmit to the two slaves. That is, channel ID 1 may be allocated to the S1 and channel ID 2 may be allocated to the S2. Both the channel ID 1 and the Channel ID 2 may be transmitted through the same stream ID 1. In addition, since bidirectional communication is possible based on the connection, the slaves may provide feedback information to the master M. For example, when S1 is a wireless earphone mounted on the right ear and S2 is a wireless earphone mounted on the left ear, it is possible to listen to music transmitted by the master M in stereo through S1 and S2.

Referring to FIG. 9, in the case of the INCL type, there is no connection between the master M and the slaves (S1, S2), and the slaves may synchronize with a INCL stream offset, an event, a timing of the sub-event based on the synchronization information advertised by the master and may receive broadcast audio data. In addition, the master M may include two profiles (profile #1 and profile #2). The first slave S1 may include the profile #1, and the second slave S2 may include the profile #1 and the profile #2. In Profile #1, the channel ID 1 and the channel ID 2 may be broadcast from the master M through one stream, Stream ID 1, and it is similar to FIG. 8 that the slaves S1 and S2 respectively receive the channel ID 1 and the channel ID in Profile #1. Additionally, in profile #2, the channel ID 1 may be broadcast from the master M through Stream ID 2, and the second slave S2 may receive Channel ID 1 in profile #2.

Figure 10:
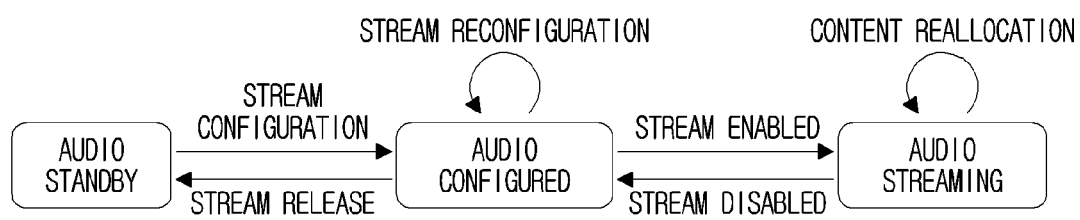
FIG. 10 is a diagram illustrating a broadcast audio stream state machine to which the present disclosure is applicable.

FIG. 10 is a diagram illustrating a broadcast audio stream state machine to which the present disclosure is applicable.

The control of the broadcast audio stream may be described as a broadcast audio stream state machine and state transition at the broadcast transmitting end.

The broadcast audio stream state machine may allow a broadcast transmitter to communicate with one or more broadcast receivers (or broadcast discovery clients) in a one-way manner without a connection or not with a broadcast receiver (or broadcast discovery client). The broadcast transmitter may communicate using a broadcast audio advertisement in the form of a Broadcast Audio Source Session (BASS). A broadcast audio stream may be transmitted by a broadcast transmitter.

The AUDIO STANDBY state means a state in which a broadcast audio stream is not transmitted.

The AUDIO CONFIGURED state means a state in which a broadcast receiver (or a broadcast discovery initiator) starts advertising information for detecting an audio stream through a periodic advertising event. The periodic advertising event may include delivering advertisement metadata, stream configuration, synchronization information, and the like. In this state, no audio data packet is transmitted from the broadcast transmitter.

The AUDIO STREAMING state means a state in which a broadcast audio stream is enabled in a broadcast transmitter and an audio data packet may be transmitted. The broadcast transmitter may continuously perform metadata advertising through periodic advertising while transmitting the broadcast audio stream. If a stream is configured in the AUDIO STANDBY state, it may transition to the AUDIO CONFIGURED state, and if the stream is released in the AUDIO CONFIGURED state, it may transition to the AUDIO STANDBY state. If a stream is enabled in the AUDIO CONFIGURED state, it may transition to the AUDIO STREAMING state, and if the stream is disabled in the AUDIO STREAMING state, it may transition to the AUDIO CONFIGURED state. If a stream reconfiguration occurs in the AUDIO CONFIGURED state, it may transition to the AUDIO CONFIGURED state. When content reassignment occurs in the AUDIO STREAMING state, it may transition to the AUDIO STREAMING state.

Figure 11:
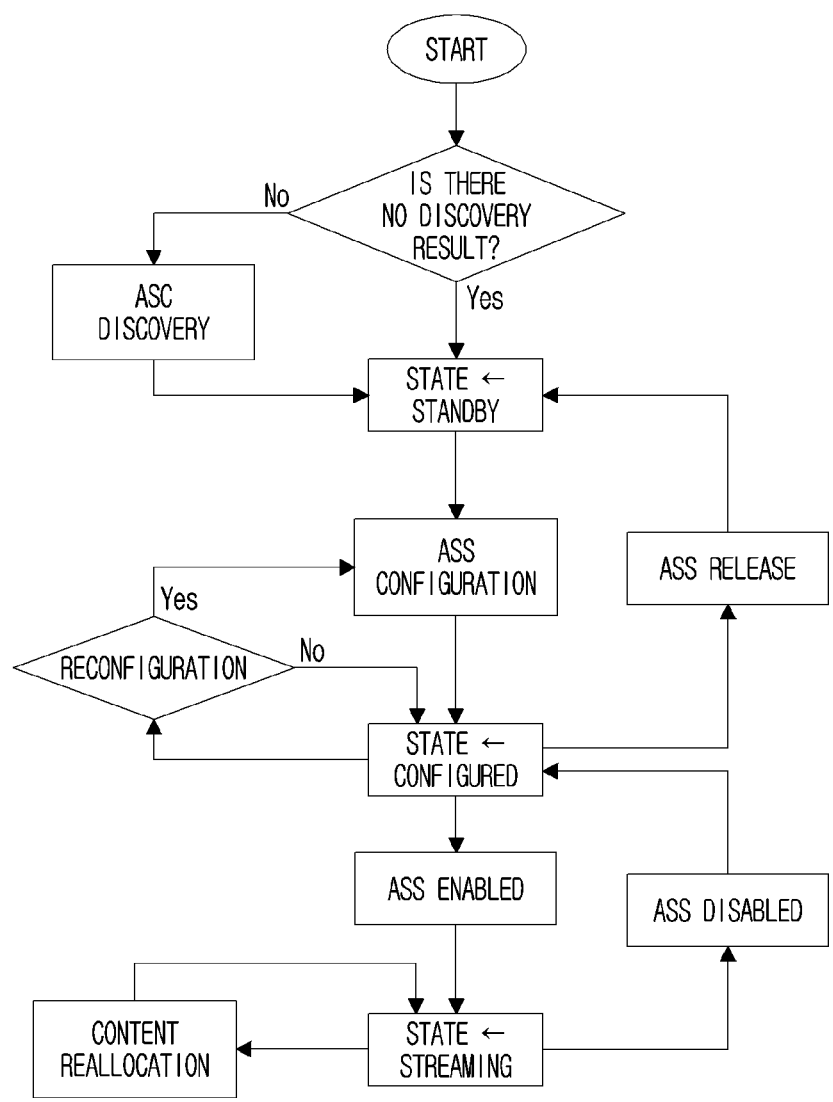
FIG. 11 is a diagram illustrating an audio setup procedure to which the present disclosure is applicable.

FIG. 11 is a diagram illustrating an audio setup procedure to which the present disclosure is applicable.

When there is no discovery result (that is, zero discovery), the AUDIO STANDBY state may be transitioned, and if there is a discovery result, discovery for Audio Stream Capability (ASC) may be performed and transition to the AUDIO STANDBY state.

When an ASS (Audio Stream Session) configuration occurs, it may transition to the AUDIO CONFIGURED state. If ASS is released in the AUDIO CONFIGURED state, it may transition to the AUDIO STANDBY state. When reconfiguration occurs in the AUDIO CONFIGURED state, it may transition to the AUDIO CONFIGURED state through the ASS configuration.

When ASS is activated, it may transition to AUDIO STREAMING state. If ASS deactivation occurs in the AUDIO STREAMING state, it may transition to the AUDIO CONFIGURED state. If content reassignment occurs in the AUDIO STREAMING state, it may transition to the AUDIO STREAMING state.

Figure 12:
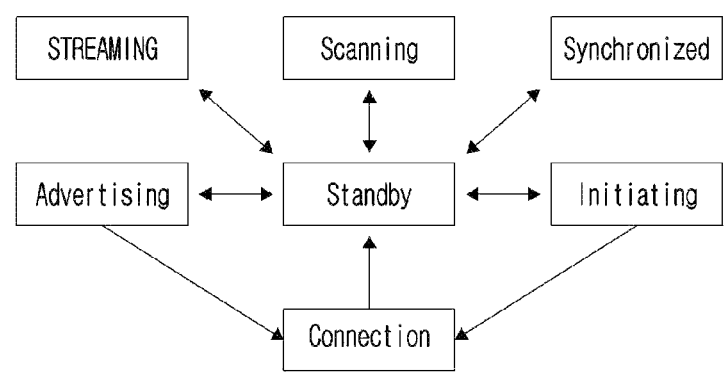
FIG. 12 is a diagram illustrating a link layer state machine to which the present disclosure is applicable.

FIG. 12 is a diagram illustrating a link layer state machine to which the present disclosure is applicable.

The operation of the link layer LL may be expressed as (in terms of an isochronous channel) Standby state, Advertising state, Scanning state, Initiating state, Connection state, Synchronized (synchronization) state, and Streaming (Isochronous Broadcasting) state.

The Standby state corresponds to a standby state before transitioning to another state.

In the Advertising state, the LL may operate as a advertiser transmitting an advertising packet. When a connection is established in the advertising state, the device may operate as a slave.

In the Initiating state, the LL may act as an initiator that listens for packets from other advertisers and initiates a connection in response to the packets. When a connection is established in the initiating state, the device may operate as a master.

In the Scanning state, the LL may act as a scanner that listens for packets from other advertisers and requests additional information.

The synchronized state may refer to a state in which an audio stream may be received or received in synchronization with another device.

The streaming state may refer to a state in which an audio stream is transmitted to another synchronized device.

Figure 13:
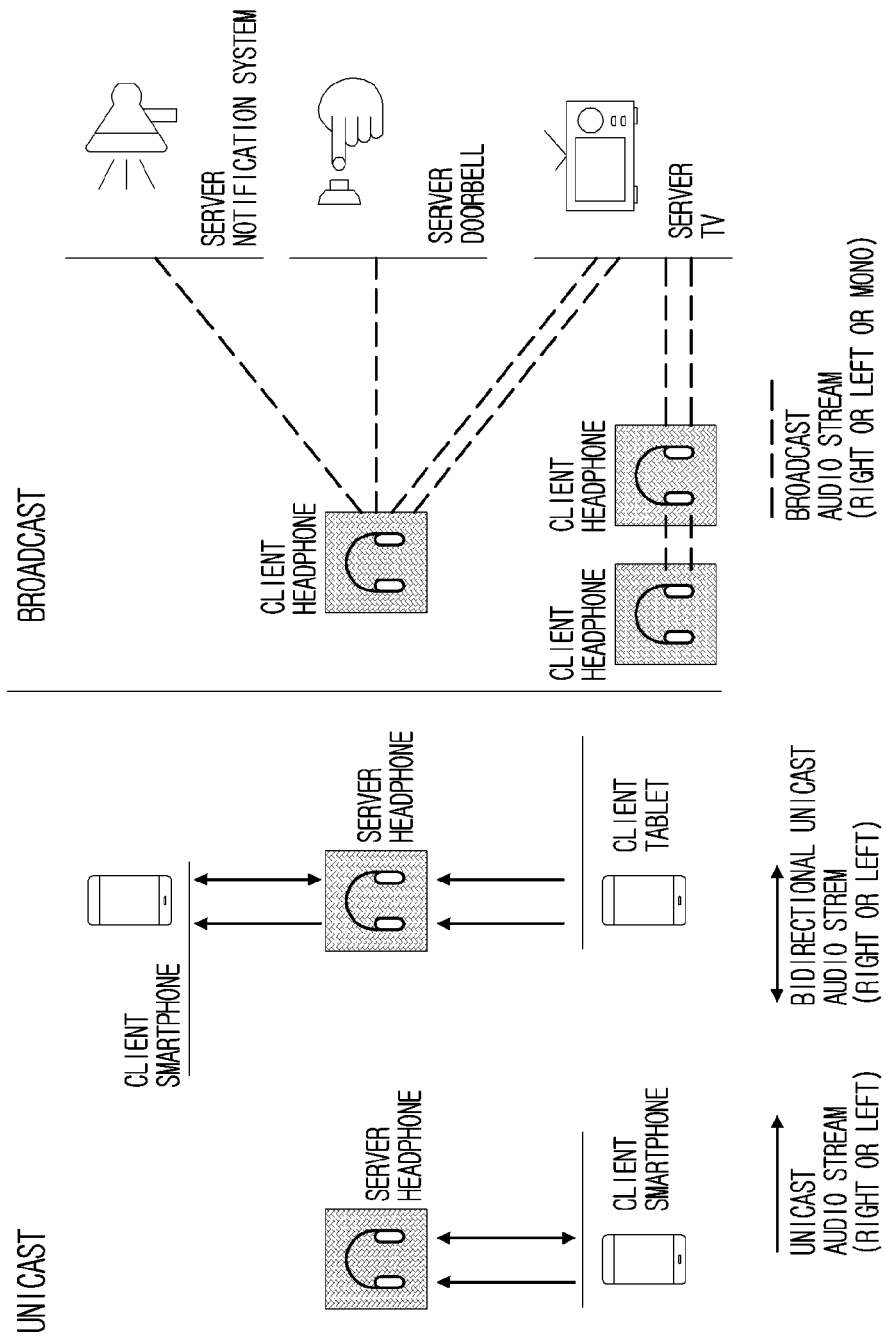
FIG. 13 is a diagram illustrating an example of an audio topology to which the present disclosure is applicable.

FIG. 13 is a diagram illustrating an audio topology to which the present disclosure is applicable.

In the case of unicast, unidirectional or bidirectional audio streams may be supported. Unicast audio data transmission/reception based on a connection between a headset and a smartphone may be performed, and the unicast audio data transmission/reception based on a connection between a headset and a smartphone and a connection between the headset and a tablet may be performed. In this case, the server of the unicast audio service may be a headphone, and the client may be a smartphone or tablet. Also, headphones may correspond to an audio sink, and a smartphone or tablet may correspond to an audio source.

In the case of broadcast, a notification system, a doorbell, a TV, etc. may transmit audio data in a broadcast manner, and one or more devices may receive the broadcast audio data. In this case, the server of the broadcast audio service may be a notification system, a doorbell, a TV, or the like, and the client may be a headphone. Also, the headphones may correspond to an audio sink, and a notification system, a doorbell, and a TV may correspond to an audio source.

Figure 14:
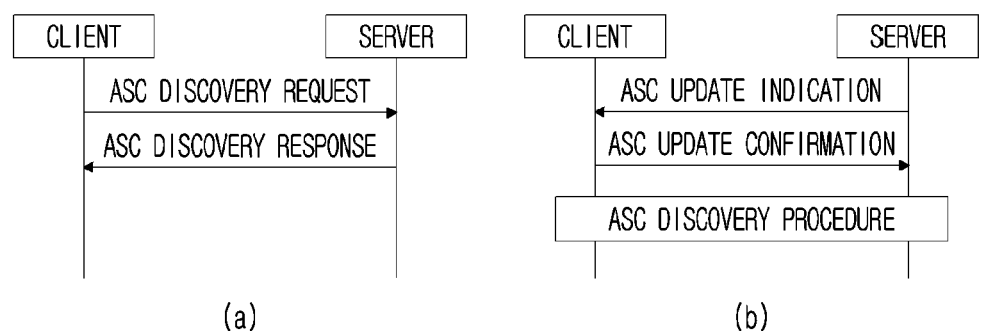
FIG. 14 to FIG. 16 are diagrams illustrating a message exchange process between a server and a client to which the present disclosure is applicable.
Figure 15:
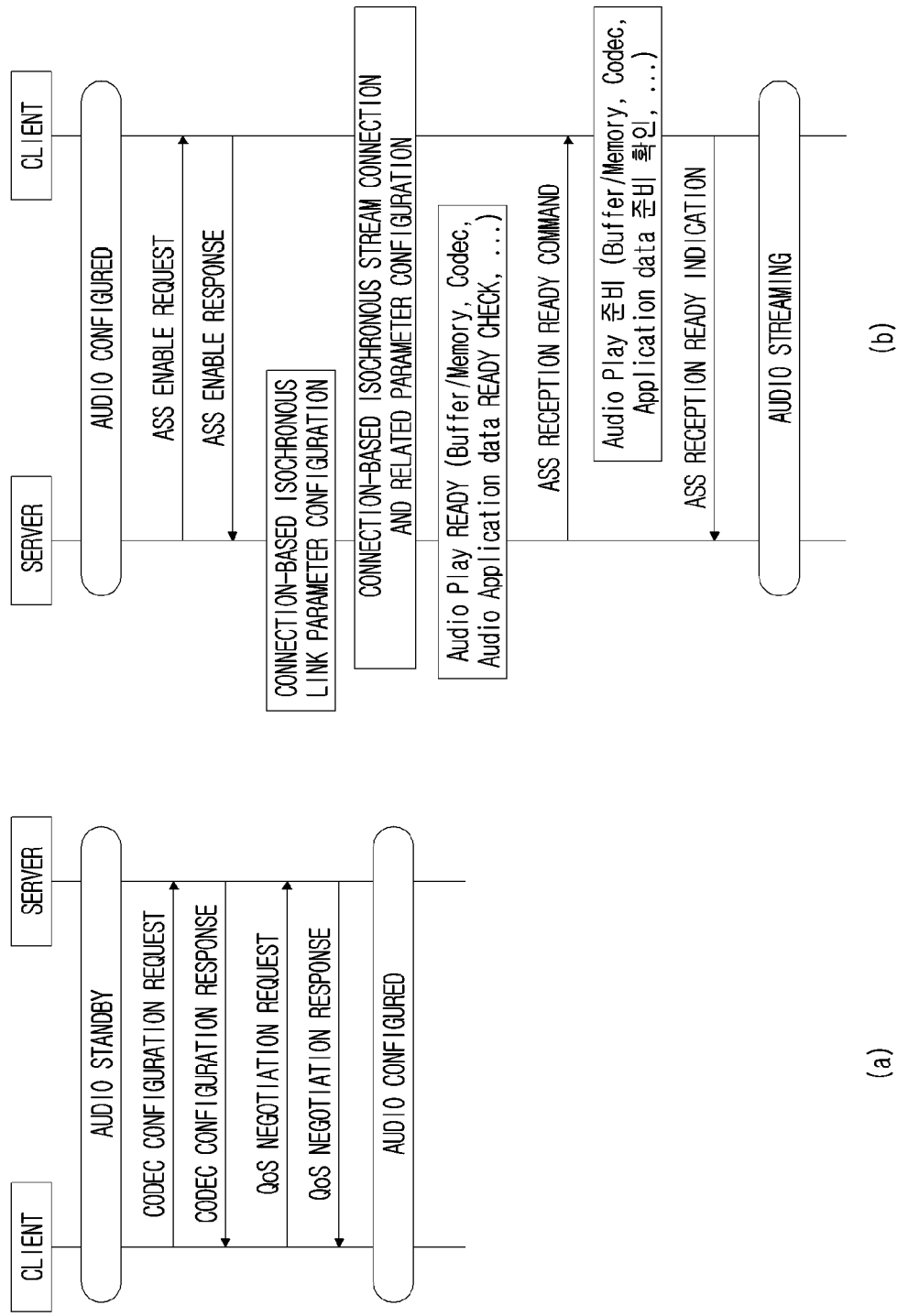
Figure 16:
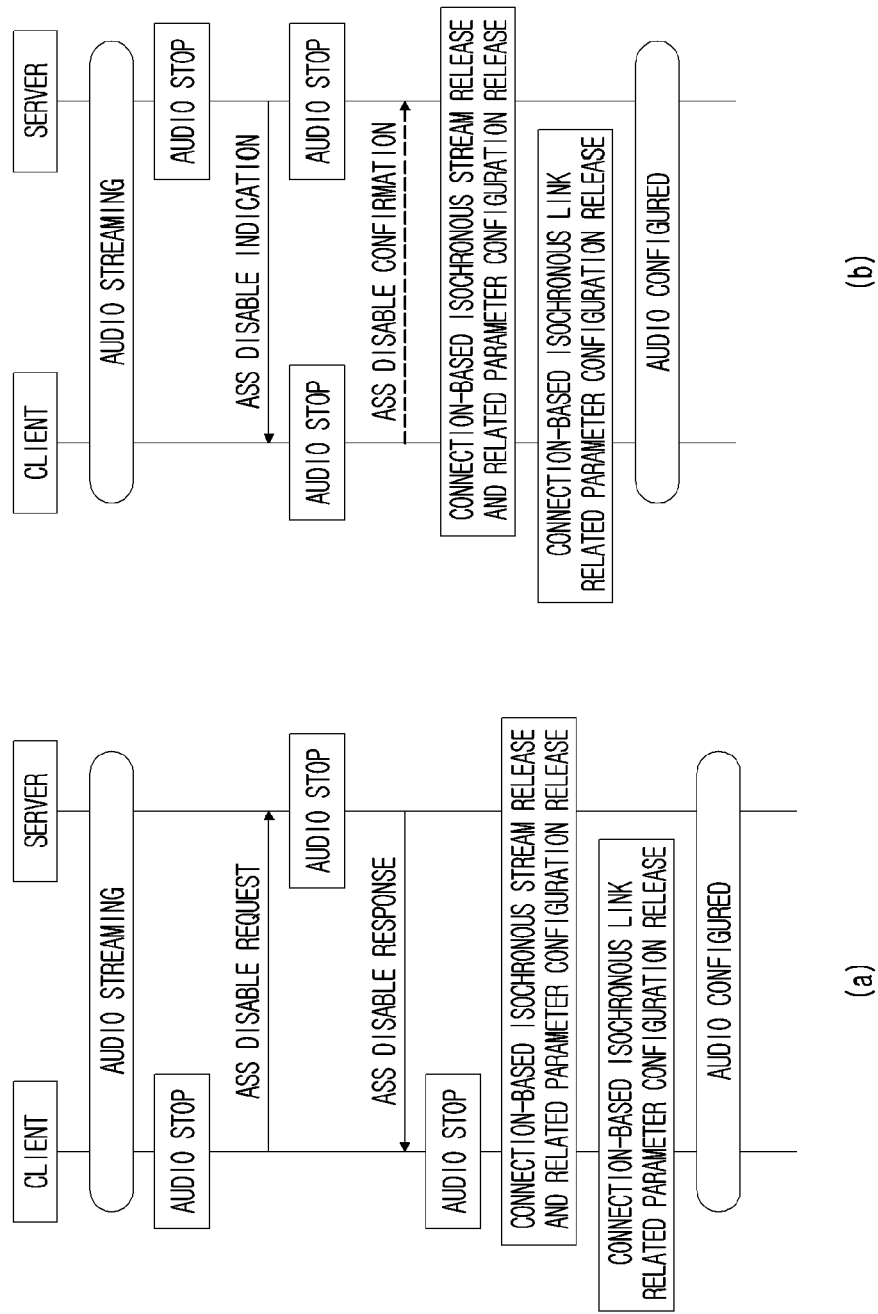

FIG. 14 to FIG. 16 are diagrams illustrating a message exchange procedure between a server and a client to which the present disclosure is applicable.

In the example of FIG. 14 to FIG. 16, the client may be an audio source and the server may be an audio sink. Or, the client may be an audio sink and the server may be an audio source.

FIG. 14 exemplarily illustrates an audio session capability (ASC) discovery procedure and an ASC update procedure.

In the audio session capability discovery procedure of FIG. 14(a), the client may request capability discovery by transmitting an ASC discovery request message to the server, and in response to that, the server may transmit detailed information of the capability by transmitting an ASC discovery response message to the client.

In the audio session capability update procedure of FIG. 14(b), the server may transmit an ASC update indication message to the client to inform that the capability update has occurred, and the client may notify the server to perform a capability update by transmitting an ASC update confirmation message. Subsequently, an audio session capability discovery procedure or an ASC discovery procedure may be performed.

The format of the message used in the example of FIG. 14 may be defined as shown in Table 1 below.

TABLE 1

ASC_DISCOVERY REQUEST
Direction
ASC_DISCOVERY RESPONSE
Sink Locations: Bitmap
Source Locations: Bitmap
Number of ASC Records
Direction
Codec ID
Sampling Frequency
Codec Specific
Content Protection Type
Content Protection type Specific The ASC update indication message and the ASC update confirmation message may include information indicating that ASC discovery is required and confirmation information therefor, respectively.

FIG. 15 exemplarily illustrate a unicast audio stream configuration procedure and an unicast audio stream establishment procedure.

In the unicast audio stream configuration procedure of FIG. 15(a), the client, in the AUDIO STANDBY state, may transmit a Codec configuration request message to the server to inform the server of the codec requesting configuration, and the like. In response, the server may transmit a codec configuration response message to the client to inform the server of QoS and rendering delay values supported by the server. In addition, the client may transmit a QoS negotiation request message to the server to specify a specific audio stream session (ASS), an audio group, and an audio stream to inform the client of QoS and rendering delay values supported by the client. In response, the server may transmit a QoS negotiation response message to the client. Accordingly, bandwidth (BW), bitrate, etc. may be determined by negotiation between the client and the server, and the client and the server may transition to a CONFIGURED state.

In the unicast audio stream establishment procedure of FIG. 15(b), the client may transmit an ASS enable request message to the server in the AUDIO CONFIGURED state to inform information on the ASS requesting activation. In response, the server may transmit an ASS enable response message to the client to inform about which ASS to activate. Configuration for connection-based isochronous link parameters may be performed at the client, and CBIS may be established by the client and the server configuring the connection-based isochronous stream connection and related parameters. If the client is the audio sink and the server is the audio source, the server may prepare to play audio data and transmit an ASS Rx ready indication message to the client, and the client may prepare to provide audio data after receiving the ASS reception ready indication notification message. Accordingly, the client and the server may transition to the AUDIO STREAMING state.

The format of the message used in the example of FIG. 15 may be defined as shown in table 2 below.

TABLE 2

CODEC CONFIGURATION REQUEST
ASS ID
ASA ID
Direction
Codec ID
Sampling Frequency
Codec Specific
CODEC CONFIGURATION RESPONSE
ASS ID
Server Supported QoS (Interleaved, Framed, Transport Latency)
Presentation delay
QOS NEGOTIATION REQUEST
ASS ID
CBISS ID
CBIS ID
Client QoS (Transport Latency)
Rendering Delay
QOS NEGOTIATION RESPONSE
ASS ID
ASS ENABLE REQUEST/ASS ENABLE RESPONSE
Number of ASS ID
ASS ID
ASA ID
Content Type
ASS RX READY COMMAND/ASS RX READY NOTIFICATION
Number of ASS ID
ASS ID FIG. 16 exemplarily illustrates a procedure for disabling an audio stream by a client and a procedure for disabling an audio stream by a server.

In the procedure of the client disable audio streams in FIG. 16(a), if the client is an audio source and the server is an audio sink, when the client decides to stop the audio in the AUDIO STREAMING state, an ASS disable request message may be transmitted to the server. Accordingly, the server may stop streaming audio data and transmit an ASS disable response message to the client. Upon receiving this, the client may stop audio data encoding and audio application operation.

Alternatively, if the client is an audio sink and the server is an audio source, the client may stop audio data streaming and transmit ASS disable request message to the client. Accordingly, the server may stop audio data encoding and audio application operation and transmit an ASS disable response message to the client.

After that, the client and the server may perform connection-based isochronous stream release and related parameter setting release. Here, in preparation for reconnection between the client and the server, device information may be stored in the client and/or the server together with an isochronous stream connection related parameter. Accordingly, the client may release the connection-based isochronous link related parameter setting. Accordingly, the client and the server may transition to the AUDIO CONFIGURED state.

In the example of FIG. 16(b), in the procedure of disabling audio streams by the server, if the server is an audio source and the client is an audio sink, when the server decides to stop audio in the AUDIO STREAMING state, an ASS disable indication message may be transmitted to the client. Accordingly, the client may stop streaming audio data and may or may not transmit an ASS disable confirmation message to the server. The server may stop encoding audio data and audio application operation with or without receiving an ASS deactivation response.

Alternatively, if the server is an audio sink and the client is an audio source, the server may stop audio data streaming and transmit an ASS disable indication message to the client. Accordingly, the client may stop the audio data encoding and audio application operation, and may or may not transmit an ASS disable confirmation message to the server.

After that, the client and the server may perform connection-based isochronous stream release and related parameter configuration release. Here, in preparation for reconnection between the client and the server, device information may be stored in the client and/or the server together with an isochronous stream connection related parameter. Accordingly, the client may release the connection-based isochronous link related parameter configuration. Accordingly, the client and the server may transition to the AUDIO CONFIGURED state.

The format of the message used in the example of FIG. 16 may be defined as shown in table 3 below.

TABLE 3

ASS DISABLE REQUEST/ASS DISABLE RESPONSE/
ASS DISABLE INDICATION
Number of ASS ID
ASS ID
(No Contents)

Table 4 below exemplarily shows content reallocation request/response, ASS release request/response, general advertisement, and directed advertisement message formats.

TABLE 4

Figure 17:
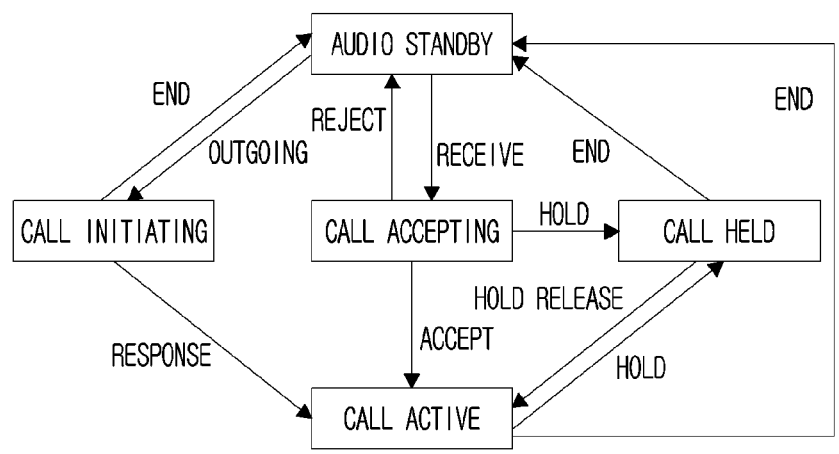
FIG. 17 is a diagram illustrating a state machine for a call service to which the present disclosure is applicable.

REASSIGN CONTENT REQUEST/
REASSIGN CONTENT RESPONSE
Number of ASS ID
ASS ID
ASA ID
Content Type
ASS RELEASE REQUEST/ASS RELEASE RESPONSE
ASS ID
GENERAL ADVERTISEMENT
DIRECTED ADVERTISEMENT
Content Type
Meta data FIG. 17 is a diagram illustrating a state machine for a call service to which the present disclosure is applicable.

When a call is received in the AUDIO STANDBY state, it may transition to the CALL ACCEPTING state. When a call is accepted in the CALL ACCEPTING state, it may transition to the CALL ACTIVE state. When a call is rejected in the CALL ACCEPTING state, it may transition to the AUDIO STANDBY state. In the case of hold in which a call cannot be received in the CALL ACCEPTING state, it may transition to the CALL HELD state, and may transition to the CALL ACTIVE state when the hold is released in the CALL HELD state. When the CALL HELD state or the CALL ACTIVE state is terminated, it may transition to the AUDIO STANDBY state.

Also, When a call is outgoing in the AUDIO STANDBY sate, it may transition to the CALL INITIATING state. When it answers a call from a remote location or the other party in the CALL INITIATING state, it may transition to the CALL ACTIVE state. When it ends in the CALL INITIATING state, it may transition to the AUDIO STANDBY state.

In such a call service state machine, audio data that needs to be delivered to the headset in the AUDIO STANDBY state may occur. For example, audio data may be transmitted to the headset when a response when a phone number is dialed is notified by sound.

Alternatively, information definitively indicating various wireless access technology (e.g., 2G, 3G, 4G, 5G, Wi-Fi, GSM, CDMA, WCDMA, etc.) related to the call service. For example, For example, a bearer technology field having a size of 1 octet may be defined. This may be related to the aforementioned call bearer service.

In the case of multiway calling, a plurality of lines may exist, and a state machine as shown in FIG. 17 may be maintained for each line. For example, when the second line transitions from the AUDIO STANDBY state to the CALL ACCEPTING state while the first line is in the CALL ACTIVE state, the first or the second line may transition to the CALL HELD state according to the user's control.

Hereinafter, logical links of Bluetooth system and logical transports will be described.

A variety of logical links may be used to support different application data transfer requirements. Each logical link is associated with a logical transport, which may have various characteristics. These characteristics may include flow control, acknowledgment/repeat mechanisms, sequence numbering and scheduling operations, and the like. A logical transport may carry various types of logical links depending on its type. A plurality of logical links may be multiplexed into the same single logical transport. A logical transport may be carried by a physical link on a particular channel.

Logical transport identification and real-time (link control) signaling may be included in the packet header, and specific logical link identification may be included in the header of the payload.

Table 5 below exemplarily illustrates logical transport types, supported logical link types, supported physical link and physical channel types, and descriptions of logical transports.

TABLE 5

| Logical transport | Links supported | Supported by | Bearer | Overview |
| --- | --- | --- | --- | --- |
| Connection based Isochronous Stream | Stream (framed or unframed) LE-S or LE-F | LE isochronous physical link | LE | Unidirectional or bidirectional transport in a point-to-point connection for transferring isochronous data. |
| Broadcast Isochronous Stream | Stream (framed or unframed) LE-S (or LE-F) and Control (LEB-C) | LE isochronous physical link | LE | Unidirectional transport for broadcasting data in a point to multipoint configuration and unidirectional transport for controlling the broadcast data |

Figure 18:
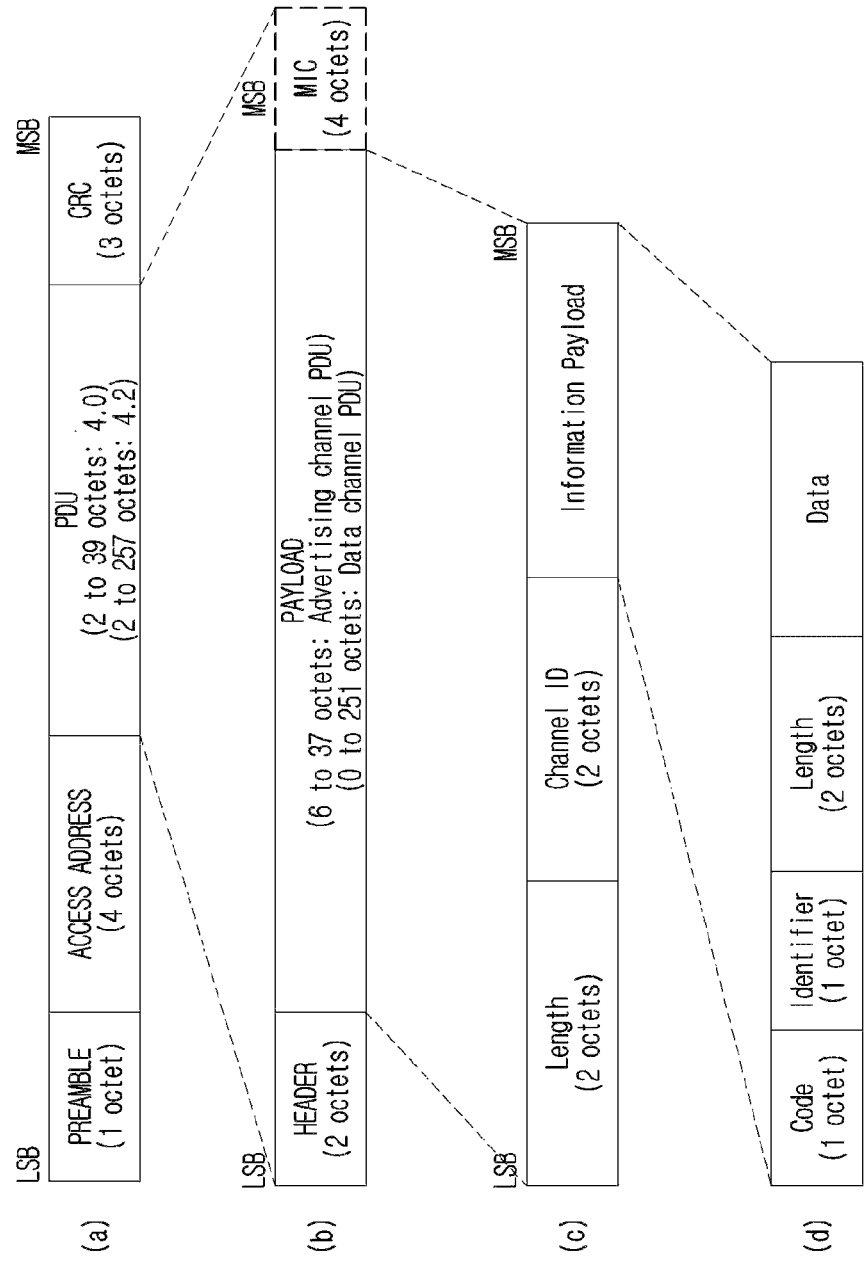
FIG. 18 is a diagram illustrating a packet format for each layer to which the present disclosure is applicable.

FIG. 18 is a diagram illustrating a packet format for each layer to which the present disclosure is applicable.

FIG. 18(*a*) illustrates an example of link layer (LL) packet format. The LL packet format may include a preamble, an access address (or an access code), a PDU, and a Cyclic Redundancy Code (CRC) field. The preamble may have a size of 1 octet, may be used for frequency synchronization, symbol timing estimation, automatic gain control (AGC) training, and the like at the receiving side, and may be configured with a predetermined bit sequence. The access address may have a size of 4 octets and may be used as a correlation code for a physical channel. A PDU may be defined with a size of 2 to 39 octets in Bluetooth 4.0 version, and may be defined as a size of 2 to 257 octets in version 4.2. The CRC may include a value calculated as a 24-bit long checksum for the PDU.

FIG. 18(*b*) illustrates an exemplary format of the PDU of FIG. 18(*a*). PDU may be defined in two types, one is a data channel PDU (Data channel PDU), the other is an advertising channel PDU (Advertising channel PDU). The data channel PDU will be described in detail with reference to FIG. 19, and the advertising channel PDU will be described in detail with reference to FIG. 20.

FIG. 18(*c*) illustrates an example of an L2CAP PDU format, which may correspond to an exemplary format of the payload field of FIG. 18(*b*). The L2CAP PDU may include a Length, a Channel ID, and an Information Payload field. The length field may indicate the size of the information payload, and the information payload field may include higher layer data. The channel identifier field may indicate which upper layer data the information payload field includes. For example, if the value of the channel identifier field is 0x0004, it may indicate ATT (ATTribute protocol), if the value of the channel identifier field is 0x0004, it may indicate SMP (Security Manager Protocol), or another channel identifier indicating a different type of upper layer or middleware Values may be defined and used.

When the L2CAP packet of FIG. 18(*c*) is an L2CAP PDU (i.e., a control frame) transmitted on a signaling channel, the information payload field of FIG. 18(*c*) may be configured as shown in FIG. 18(*d*). The information payload field may include a code (Code), an identifier (Identifier), a length (Length) and data (Data) fields. For example, the code field may indicate the type of the L2CAP signaling message. The identifier field may include a value that matches the request and the response. The length field may indicate the size of the data field. Data fields may contain attributes. An attribute is a unit of arbitrary data, and may include, for example, data at various points in time in various states of the device, such as location, size, weight, temperature, and speed.

An attribute may have a format including an attribute type, an attribute handle, an attribute value, and an attribute permission.

The attribute type may include a value indicating the type of attribute data identified by a Universally Unique Identifier (UUID).

The attribute handle may contain a value assigned by the server to identify attribute data.

The attribute value may include the value of attribute data.

Attribute permission may be configured by GATT (Generic ATTribute profile), and may include a value indicating the type of allowed access (e.g., whether it can read/write, whether encryption is required, whether authentication is required, whether authorization is required, etc.) to the corresponding attribute data.

In point of view of an Attribute protocol (ATT)/Generic Attribute Profile (GATT), a device may serve as a server and/or a client. The server may serve to provide attributes and related values, and the client may play a role of discovering, reading, or writing attributes on the server.

In ATT/GATT, it may support the transmission and reception of attribute data between the server and the client. For this, the PDU supported by the ATT protocol may include six method types, that is, request, response, command, notification, indication, and confirmation.

A request is sent from the client to the server, and a response from the server is required. A response is sent from the server to the client, and is sent when there is a request from the client. A command is sent from the client to the server, and no response is required. A notification is sent from the server to the client, and confirmation is not required. An indication is sent from the server to the client, and confirmation of the client is required. A confirmation is sent from the client to the server, and is sent when there is an instruction from the server.

In addition, GATT may support various profiles. The structure of the GATT-based profile may be described as a service (service) and characteristics (characteristics). A device may support one or more profiles. One profile may include zero or one or more services. A plurality of profiles may use the same service. One service may include one or more characteristics. A characteristic means a data value that is the subject of read, write, indicate, or notify. That is, a service may be understood as a data structure used to describe a specific function or feature, and a service that is a combination of characteristics may indicate an operation performed by a device. All services are implemented by the server and may be accessed by one or more clients.

Figure 19:
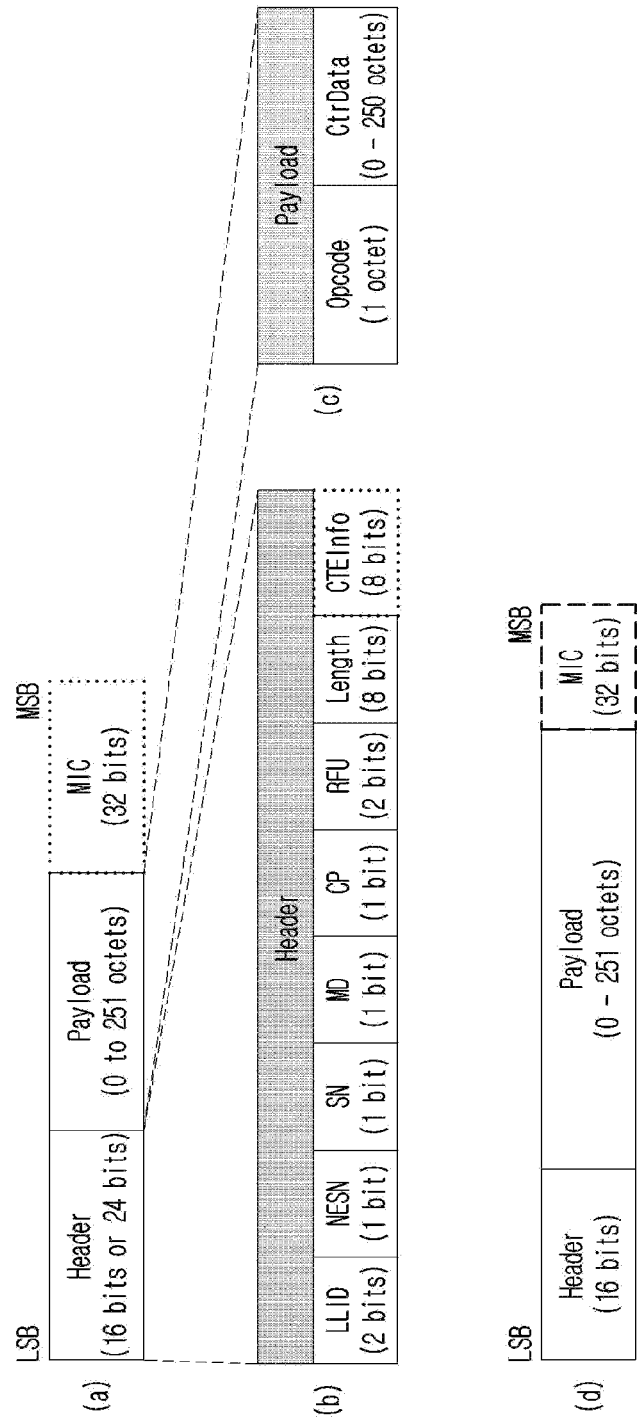
FIG. 19 is a diagram illustrating examples of a data unit format to which the present disclosure is applicable.

FIG. 19 is a diagram illustrating examples of a data unit format to which the present disclosure is applicable.

FIG. 19(*a*) illustrates an exemplary format of a data physical channel PDU (Protocol Data Unit). The data channel PDU may be used to transmit a packet on the data physical channel (e.g., channel number 0 to 36). The data physical channel PDU includes a 16 or 24 bit length header and a variable size (e.g., 0 to 251 octet size) payload, and may further include a Message Integrity Check (MIC) field. For example, the MIC field may be included in the case of an encrypted link layer connection in which the payload field size is not 0.

As shown in FIG. 19(*b*), the header fields may include LLID (Logical Link Identifier), NESN (Next Expected Sequence Number), SN (Sequence Number), MD (More Data), CP (CTEInfo Present), RFU (Reserved). for Future Use). The RFU corresponds to a part reserved for future use when necessary, and its value may be usually filled with 0. Also, according to the value of the CP field, the header field may further include a Constant Tone Extension Information (CTEInfo) subfield. In addition, the Length field may indicate the size of the payload, and when the MIC is included, it may indicate the length of the payload and the MIC.

FIG. 19(*c*) illustrates an exemplary format of an LL Control PDU. The LL Control PDU may correspond to a data physical channel PDU used to control link layer connection. The LL Control PDU may have a fixed value according to an operation code (Opcode). The Opcode field may indicate the type of the LL Control PDU. The control data (CtrData) field may have various formats and lengths specified by the Opcode.

For example, the Opcode of the LL Control PDU may have a value (e.g., 0x1F, 0x20, 0x21, 0x22, ... ) indicating one of LL_CBIS_REQ, LL_CBIS_RSP, LL_CBIS_IND, LL_CBIS_TERMINATE_IND, LL_CBIS_SDU_CONFIG_REQ, and LL_CBIS_SDU_CONFIG_RSP.

When the opcode indicates LL_CBIS_REQ, the CtrData field may include information necessary for a CBIS request together with CBISS identification information and CBIS identification information. Similarly, in each case where the Opcode indicates one of LL_CBIS_RSP, LL_CBIS_IND, LL_CBIS_TERMINATE_IND, LL_CBIS_SDU_CONFIG_REQ, LL_CBIS_SDU_CONFIG_RSP, the CtrData may include information required for a CBIS response, a CBIS indication, a CBIS termination indication, a CBIS Service Data Unit (SDU) setup request, and a CBIS SDU setup response.

FIG. 19(d) illustrates an example of audio data PDU format.

Audio data PDU may be CBIS PUD or broadcast isochronous PDU. When used in a CBIS stream, the audio data PDU may be defined as CBIS PDU. When used in a broadcast isochronous PDU, the audio data PDU may be defined as broadcast isochronous PDU.

The audio data PDU may include a 16-bit length header field and a variable length payload field. Also, the audio data PDU may further include a MIC field.

In the case of a CBIS PDU, the format of the header field may include 2-bit LLID, 1-bit NESN, 1-bit SN, 1-bit Close Isochronous Event (CIE), 1-bit RFU, 1-bit Null PDU Indicator (NPI), 1-bit RFU, 9-bit Length subfield.

In the case of broadcast isochronous PUD, the format of the header field may include 2-bit LLID, 3-bit Control Subevent Sequence Number (CSSN), 1-bit Control Subevent Transmission Number (CSTF), 2-bit RFU, and 8-bit Length subfield.

The payload field of audio data PDU may include audio data.

Figure 20:
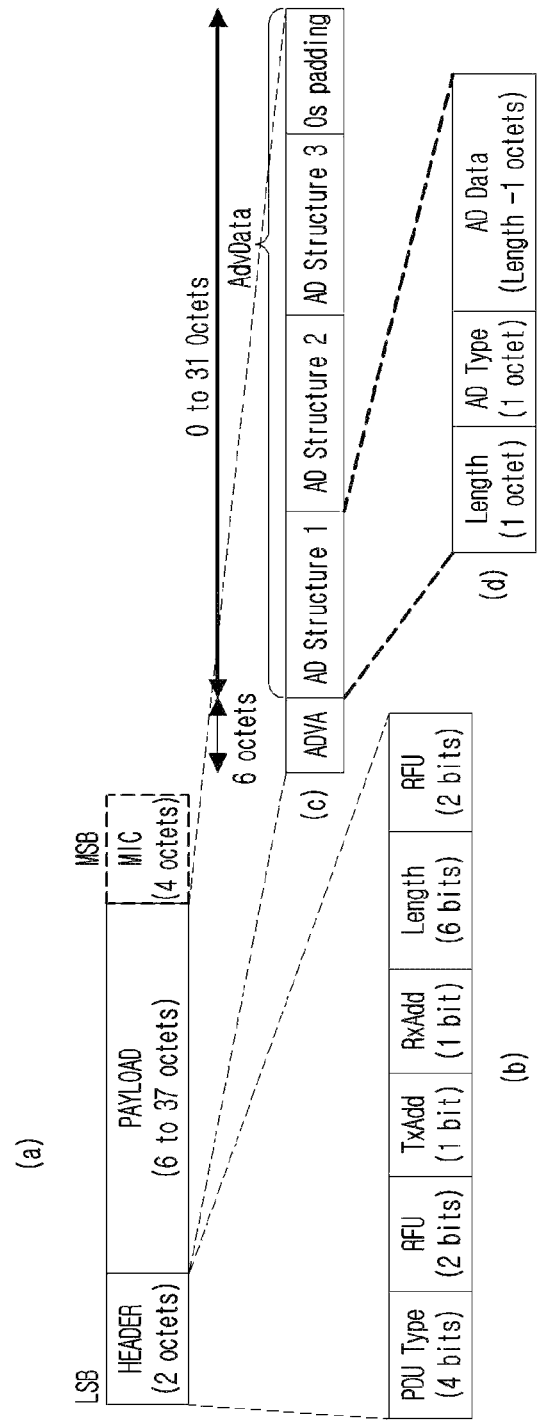
FIG. 20 is a diagram illustrating examples of an advertisement unit format to which the present disclosure is applicable.

FIG. 20 is a diagram illustrating examples of an advertisement unit format to which the present disclosure is applicable.

FIG. 20(a) shows an exemplary format of an Advertising Physical Channel PDU (Protocol Data Unit). The advertising channel PDU may be used to transmit packets on an advertising physical channel (e.g., channel numbers 37, 38, 39). The advertising channel PDU may consist of a header of 2 octets and a payload of 6 to 37 octets.

FIG. 20(b) shows an exemplary format of a header of an advertising channel PDU. The header may include a PDU type, a Reserved for Future Use (RFU), a transmission address (TxAdd), a reception address (RxAdd), a length (Length), and an RFU field. The length field of the header may indicate the size of the payload.

FIG. 20(c) shows an exemplary format of a payload of an advertising channel PDU. The payload may include an Advertiser Address (AdvA) field with a length of 6 octets and an AdvData field with a length of 0 to 31 octets. The AdvA field may include a public address or a random address of the advertiser. The AdvData field may include zero or more advertising data (AD) structures, and padding if necessary.

FIG. 20(d) shows a format of one AD structure. The AD structure may include three fields. A length field may indicate a length of a AD Data field. That is, a value obtained by subtracting 1 from the value indicated by the length field may correspond to the length of the AD Data field. The AD Type field may indicate a type of data included in the AD Data field. The AD Data field may include advertising data provided from a host of an advertiser.

Hereinafter, cloud authentication pairing according to the present disclosure will be described.

The present disclosure relates to secure automatic authentication with a new pairing target device.

According to the present disclosure, an embodiment of automatically performing authentication between the first device (or provider) and the second device (or seeker) by transmitting information about the first device to a second device in advance through an account server (or credential broker).

For example, information on the first device may be provided in advance to the account server through a third device (or second seeker) associated with the same account (or user) as the second device (or first seeker).

For example, the first device may be a pairing target device (e.g., headsets, earbuds, etc.) that can be paired (or connected to) various devices, and the second and/or third device (or first and/or second seeker) may correspond to a user device capable of providing data to the first device by being paired with the first device.

In addition, in view of the protocol according to the present disclosure, the first device may correspond to a provider. The second and/or third device may correspond to a seeker.

Accordingly, the user may be connected or paired with the pairing target device (e.g., the first device) in a plurality of devices (e.g., the second and third devices) seamlessly.

Figure 21:
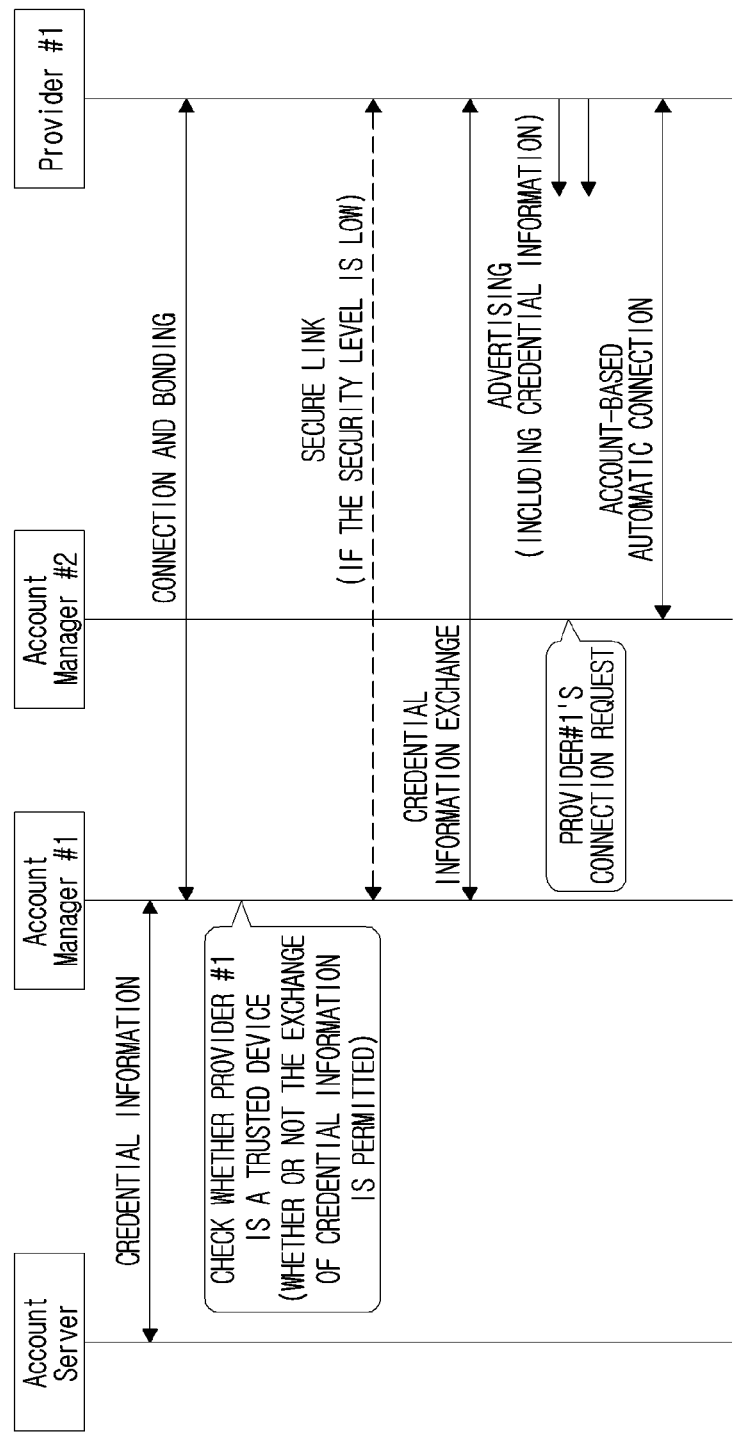
FIG. 21 is a diagram for describing an example of an automatic authentication method to which the present disclosure may be applied.

FIG. 21 is a diagram for describing an example of an automatic authentication method to which the present disclosure may be applied.

The example of FIG. 21 may include a method of providing automatic authentication for a device based on a user account using a cloud or a server.

The account server (or credential broker) may maintain and manage user information (e.g., credential information on a user account, etc.), provider device information, account manager information, and the like.

An account manager (or seeker) may obtain user information and manage user information through interaction with the user. For example, an account manager may be included in an audio source or user device (e.g., a smartphone, laptop computer, etc.). In the present disclosure, it is assumed that a plurality of account managers are associated with one and the same user account. Also, the account manager may correspond to a seeker seeking user information from a provider.

A provider may obtain user information and establish automatic connection (or pairing) with an account manager based on user information. For example, the provider may be included in an audio sink or peripheral (e.g., a headset).

The account server (or credential broker) may exchange information with the account manager (or seeker) and/or provider via various out-of-band (OOB) communication methods (e.g., HTTP over the Internet). From the point of view of a user using a device including an account manager, the account server may be recognized as included in the cloud.

Meanwhile, the account manager (or seeker) and the provider may exchange information through an in-band communication method (e.g., a Bluetooth-based communication method). For example, the account manager and the provider may exchange information through the readding/writing/indicating/notifying procedure of the characteristic(s) based on GATT.

For example, in FIG. 21, the Account Server may transmit credential information of a specific user to Account Manager #1 through message exchange with Account Manager #1.

When Account Manager #1 establishes a Bluetooth-based connection and bonding (or pairing) with Provider #1, it may check whether Provider #1 is a trusted device to the user and whether to provide credential information to Provider #1.

If the user allows (e.g., the user selects Allow/Yes for the alarm about whether to allow the exchange of credential information through the user interface (UI) of Account Manager #1), a credential information exchange procedure may be performed.

If the security level is low, a secure link is created between Account Manager #1 and Provider #1 to perform the credential information exchange procedure. If the security level is high, the credential information exchange process may be performed without the process of creating a secure link.

Through this credential information exchange, Provider #1 may acquire all or part of credential information (e.g., a hash value generated based on credential information).

Provider #1 may advertise the obtained credential information.

Figure 22:
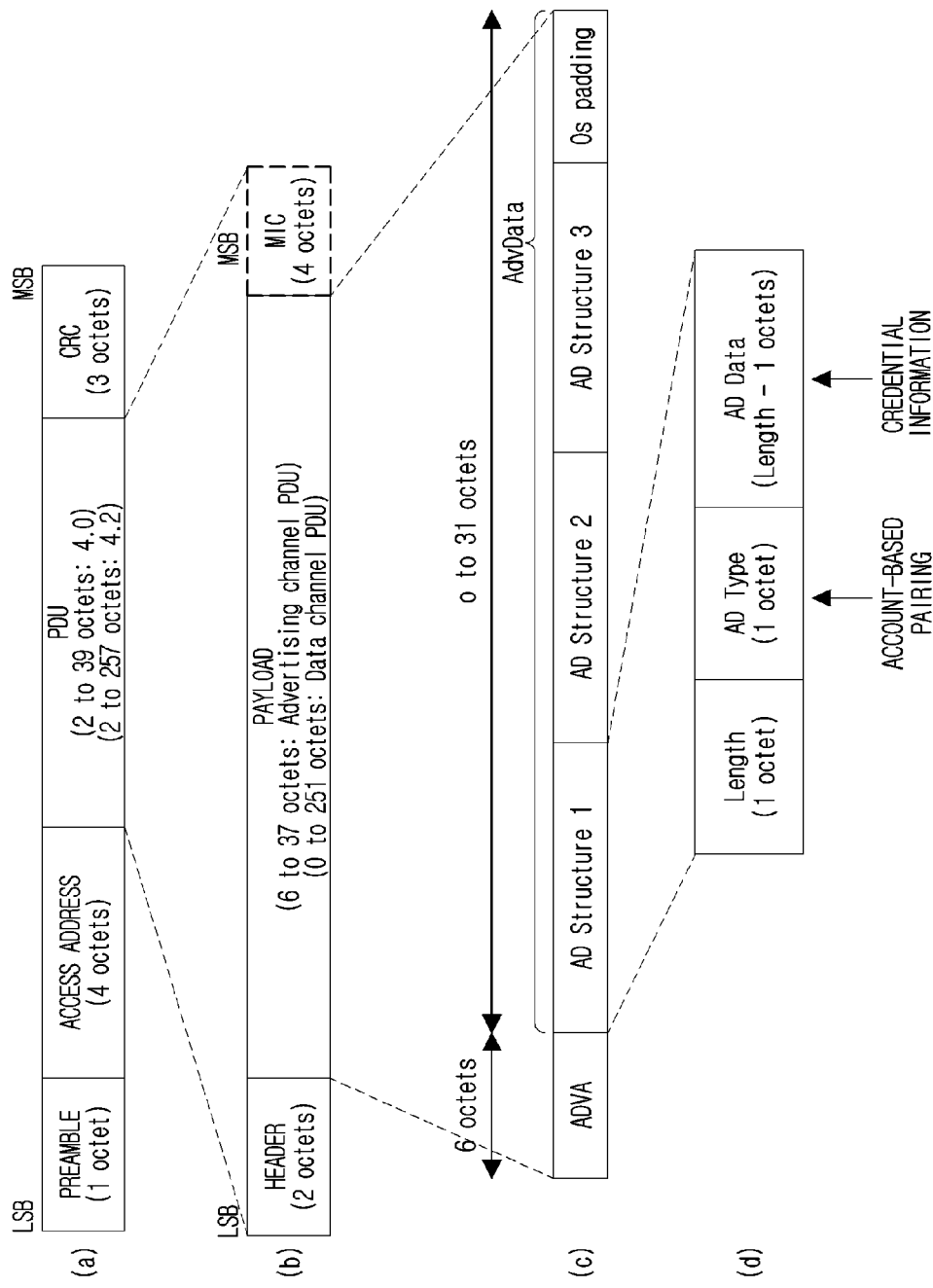
FIG. 22 is a diagram illustrating an exemplary format of an advertising packet to which the present disclosure may be applied.

FIG. 22 is a diagram illustrating an exemplary format of an advertising packet to which the present disclosure may be applied.

The present disclosure includes an example of defining a new type of advertising packet for advertising of credential information. For example, using the advertising packet format, the advertising data type may be specified as a new value indicating data related to a user account, and information based on credential information may be included in the advertising data.

FIG. 22(a) and FIG. 22(b) correspond to FIG. 18(a) and FIG. 18(b), and thus description thereof will be omitted. However, since FIG. 22 is for an advertising packet, the payload of FIG. 22(b) may be composed of an advertising channel PDU having a length of 6 to 37 octets.

In the case of the advertising packet, the payload of FIG. 22(b) may include an AdvA field with a length of 6 octets and an AdvData field with a length of 0 to 31 octets as shown in FIG. 22(c). The AdvA field may include a public address or a random address of the advertiser. The AdvData field may include zero or more advertising data (AD) structures and padding if necessary.

FIG. 22(d) shows the format of one AD structure. The AD structure may include three fields. The length field may indicate the length of the AD data field. That is, a value obtained by subtracting 1 from the value indicated by the length field may correspond to the length of the AD Data field. The AD Type field may indicate the type of data included in the AD Data field. The AD Data field may include advertising data provided from the advertiser's host.

In order to indicate a new advertising packet related to a user account used in the present disclosure, AD Type may include a value indicating information related to a user account, and AD Data may include information generated based on user information. For example, AD Type may have a value indicating "Account Based Pairing". In addition, AD Data may include a hash value generated based on the user's credential information.

As such, in order to transmit the advertising packet including the credential information in the advertising data, it may be designed by including information based on credential information in the advertising packet (specifically, payload of advertising channel PDU) and changing it to include the AD Type indicating it.

As such, by advertising information based on the user's credential information, the user account-based connection method according to the present disclosure may be applied even to a device supporting the existing advertising packet format.

The user credential information may further include various pieces of information. For example, the user credential information may further include one or more of a device model identifier, public key, hash value, account name, permission level, refresh period, credential validity, credential type, and account type.

Referring back to FIG. 21, Provider #1 may advertise an advertising packet including user credential information in the format shown in FIG. 22.

Upon receiving the advertising packet including the user's credential information, Account Manager #2 may notify the user that it may be connected to the Provider #1 device.

Here, Account Manager #1 and #2 may correspond to devices associated with the same user account. Accordingly, Account Manager #2 may determine Provider #1 having credential information for a user account to which it is associated as the device of the corresponding user.

In addition, Account Manager #2 may omit a procedure such as authentication for initial pairing and support pairing with Provider #1 even if it has never previously been connected or paired with Provider #1.

That is, even if Provider #1 is a new pairing target device for Account Manager #2, Account Manager #2 may notify the user that pairing with Provider #1 is possible, as if it had previously been paired with Provider #1.

For example, Account Manager #2 may display Provider #1 as the user's device (including user identifiable information such as user ID, e-mail address, etc.) and notify the user through a connection confirmation request through the UI.

If the user permits the connection between Account Manager #2 and Provider #1, an account-based automatic connection procedure may be performed.

Figure 23:
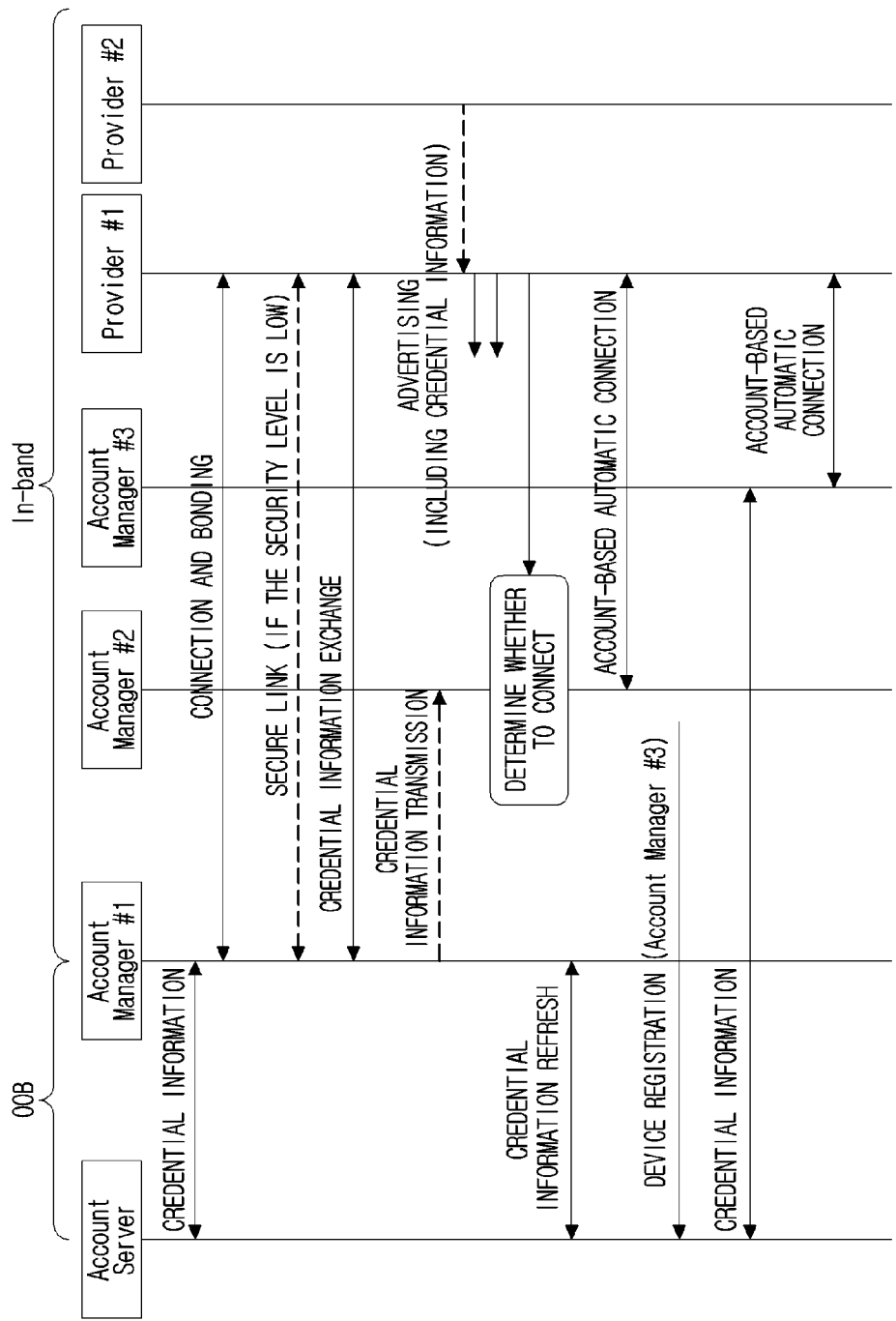
FIG. 23 is a diagram for describing an additional example of an automatic authentication method to which the present disclosure may be applied.

FIG. 23 is a diagram for describing an additional example of an automatic authentication method to which the present disclosure may be applied.

In the example of FIG. 23, a description of a portion overlapping with the example of FIG. 21 will be omitted.

A procedure for transferring credential information from Account Manager #1 to Account Manager #2 in FIG. 23 will be described. A user's credential information may be transferred directly between Account Managers (or seekers) (e.g., between a smartphone and a laptop computer). For example, a user's credential information held by Account Manager #1 may be transferred directly to one or more other Account Managers (e.g., Account Manager #2 and/or #3).

As a further example, Account Manager #1 may associate (or register) a user account with one or more other Account Managers (e.g., Account Manager #2 and/or #3) by sending a registration device message to the server. Through this, even if the user does not directly operate Account Manager #2 device, Account Manager #3 device may be registered to their account through Account Manager #1, which is a specific device (e.g., the user's preferred device). Accordingly, the Account Server may transmit the user's credential information to Account Manager #3 through message exchange with Account Manager #3.

As such, the Account Manager (or seeker) who has received the user's credential information from the server or from another Account Manager may perform automatic connection based on a user account with a Provider device advertising user's credential information (or information based thereon).

Meanwhile, the server may perform a procedure of refreshing user credential information periodically or when a predetermined event (e.g., expiration of credential validity period, etc.) occurs. When the user credential information is updated, the server or Account Manager holding the updated credential information may transmit the updated credential information to another Account Manager.

On the other hand, if Account Manager #1 establishes a secure link with Provider #1, Account Manager #2, which receives user credential information from Account Manager #1 and establishes a connection with Provider #1 may be restricted so that it cannot establish a higher level connection with Provider #1 than the security level of Account Manager #1 and Provider #1. In the case of Account Manager #3, which obtained credential information directly from the server, this security level restriction may not apply.

As an additional example, Provider #1 and Provider #2 may be two devices configured as one set (e.g., a pair of earbuds). In this case, one representative device among the two devices may advertise basic information for account-based automatic connection. For example, Provider #1 may obtain information of Provider #2 in advance, and may perform advertising by generating an advertising packet including information of Provider #2. In this case, the user's credential information (or information generated based on it) may be obtained from at least one of Provider #1 or Provider #2, and one of the providers may perform advertising including credential information (or information generated based thereon) on behalf of (or representing) other providers or by receiving necessary information from other providers.

Figure 24:
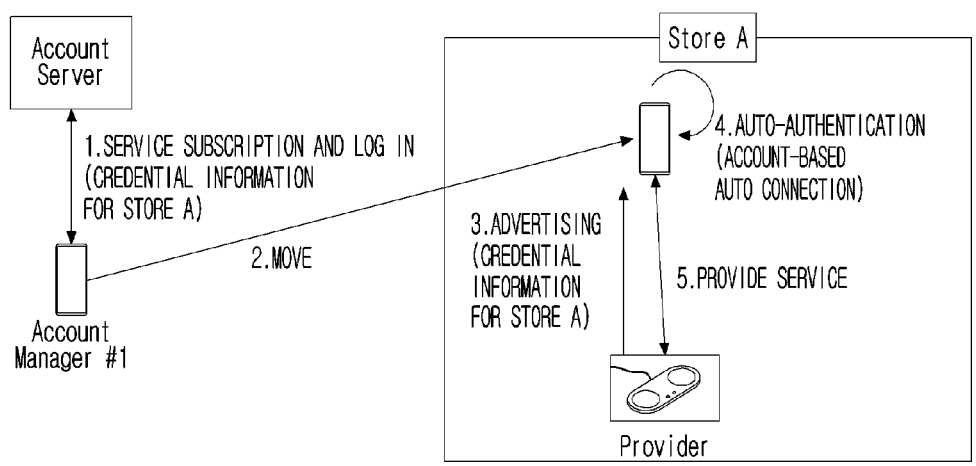
FIG. 24 is a diagram illustrating an application example of account-based automatic connection to which the present disclosure may be applied.

FIG. 24 is a diagram illustrating an application example of account-based automatic connection to which the present disclosure may be applied.

In step 1, Account Manager #1 may exchange user credential information through procedures such as service subscription and login to the Account Server. For example, the user credential information may include user credential information (e.g., credential information for store A) for a specific store (e.g., Store A). Here, it is assumed that the provider deployed in Store A has credential information for Store A in advance. For example, the representative device of Store A may receive credential information about Store A from the Account Server, and may provide it to one or more providers deployed in Store A.

In step 2, the user may move to a specific place with the device (e.g., smartphone) installed with Account Manager #1. The specific place provides a service subscribed to by the user, but may be a store (e.g., Store A) that the user first visits. That is, it is assumed that the provider (e.g., wireless charger) disposed in a specific store (Store A) is a new pairing target device that has no history of connection with the device in which Account Manager #1 is installed.

In step 3, the provider may advertise the credential information for Store A that it has in advance. Accordingly, in step 4, Account Manager #1 may establish an account-based automatic connection with the Provider. Since the detailed operation of the provider's credential information advertising and the automatic account-based connection based thereon is the same as the above-described examples, a redundant description will be omitted.

A device that automatically establishes an account-based connection with a provider through Account Manager #1 may receive a service (e.g., wireless charging) through the provider in step 5.

As such, Account Manager #1 may receive services by completing pairing immediately, as if there was a history of pairing with the corresponding provider before, without going through a separate authentication procedure with the new pairing target provider.

Figure 25:
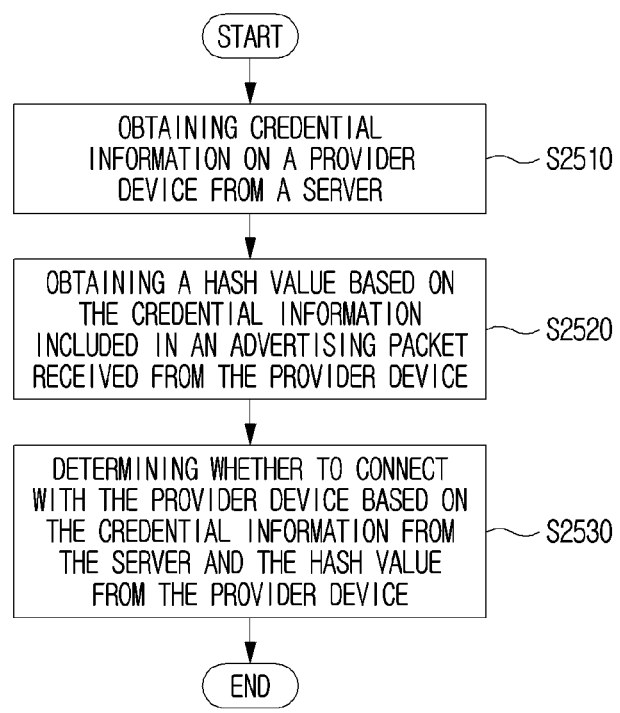
FIG. 25 is a diagram for describing an account-based pairing method to which the present disclosure may be applied.

FIG. 25 is a diagram for describing an account-based pairing method to which the present disclosure may be applied.

In step S2510, the seeker device (or account manager device) may obtain credential information about the provider device from the server (or account server, or credential broker).

In step S2520, the seeker device may obtain an advertising packet from the provider device. The advertising packet may include a hash value based on credential information held by the provider device.

In step S2530, the seeker device may determine whether to connect with the provider device based on the hash value based on the credential information obtained from the server in step S2510 and the credential information obtained from the provider device in step S2520.

For example, when the credential information that is the basis of the hash value obtained from the provider is the same as the credential information obtained from the server, the seeker device may establish a connection with the corresponding provider.

If the advertising packet received from the provider device does not include a hash value based on credential information (e.g., if the server does not hold credential information for the provider device, and thus the seeker device does not also hold credential information for the provider device, and the provider and seeker are paired for the first time), the seeker device and the provider device may establish a general pairing (or a connection with a lower security level) instead of an account-based pairing. Accordingly, the seeker device may check whether the corresponding provider device is a trusted device.

If the provider device is a trusted device, the seeker device may provide credential information to the provider device.

Thereafter, the provider device may advertise an advertising packet including a hash value based on the updated credential information.

Hereinafter, examples of media synchronization according to the present disclosure will be described.

In generating media (audio and/or video) data, one or more audio recording devices (e.g., microphones) and one or more video recording devices (e.g., cameras) may be used. In this case, time synchronization between audio data and video data, between a plurality of audio data, or between a plurality of video data is required for editing of media data or the like.

When these audio/video recording devices are wirelessly connected, there is a problem in that time synchronization is not easy. For example, since various audio/video time synchronization methods based on technologies of device manufacturers are applied, it is difficult to configure various topologies using devices of different manufacturers.

In this embodiment, a method of providing time synchronization of media data using a predetermined media synchronization clock may be included. The media synchronization clock may be a clock synchronized with each other in different devices.

This embodiment includes providing a time reference point to the media data based on the media synchronization clock. For example, by associating the first audio data generated by the first device with a time stamp based on a media synchronization clock, and associating the second audio data generated by the second device with a timestamp based on the media synchronization clock, the first and second audio data may be aligned based on timestamps synchronized with each other in the first and second devices.

For example, the media synchronization clock may be a Bluetooth clock (BT Clock). For example, by adjusting the internal clock of each of the devices connected by the Bluetooth method, it may provide a temporary BT clock that is mutually synchronized between the devices.

As such, according to the present disclosure, time synchronization may be provided using standardized BT Clock-based synchronization. For example, by transmitting a BT Clock-based timestamp included in the audio information, audio streams may be aligned based on the timestamp.

Embodiments of the present disclosure may be applied to a situation in which a video is recorded through a camera while receiving and storing an audio input of the wireless microphone in the smartphone by connecting the wireless microphone and the smartphone. In this case, audio control or microphone-related control is possible.

For example, when the camera is paused, the surrounding synchronized microphones and devices are paused, and when the camera is operated again, the nearby synchronized microphones and devices resume operation, thereby providing convenience of use.

Figure 26:
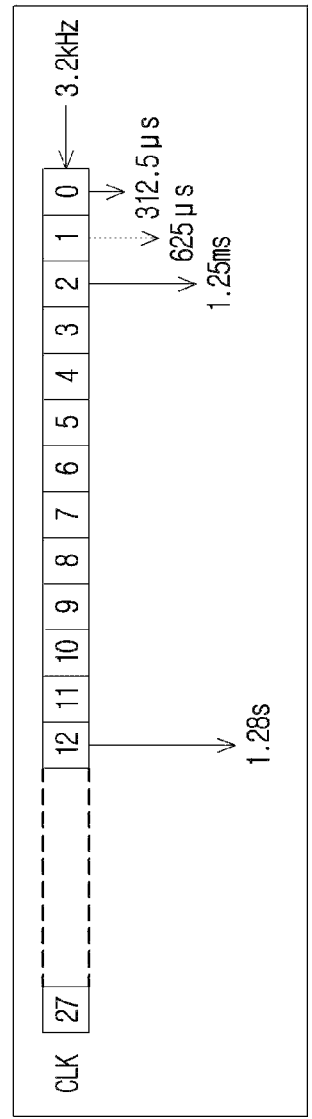
FIG. 26 is a diagram for describing a media synchronization clock to which the present disclosure may be applied.

FIG. 26 is a diagram for describing a media synchronization clock to which the present disclosure may be applied.

Bluetooth devices may have their own native clock. The native clock may be derived from a free running reference clock. In order to synchronize the native clock of the Bluetooth device with the non-Bluetooth device, an offset may be applied to the reference clock. In order to synchronize the native clock of the Bluetooth device with other Bluetooth devices, an appropriate offset may be added to each native clock, and accordingly, a temporary clock that is mutually synchronized between Bluetooth devices may be provided, and as described above, the clock synchronized between devices may be referred to as a media synchronization clock in the present disclosure. For example, the media synchronization clock may correspond to the BT Clock.

The media synchronization clock may not be related to Time of Day (ToD) and may be initialized to an arbitrary value. The media synchronization clock may have a period of about one day in length. Referring to FIG. 24, for example, when the media synchronization clock is implemented as a 28-bit counter, a value of 0 to $2^{28}-1$ may wrap around. The least significant bit (LSB) may tick by one in units of 312.5 us (microsecond) (or half a time slot), and the clock rate may be 3.2 kHz. In addition, the reference clock may have an accuracy of up to 250 ppm (parts per million) error in STANDBY, HOLD, and the like, and may have an accuracy of 20 ppm error in other states. This accuracy may be used in performing clock adjustments within the network.

As described above, when a media synchronization clock synchronized between devices is configured, a reference point (e.g., a timestamp) based on the media synchronization clock may be included in the media data. Such a reference point may be used to match (or align) the synchronization of media data from different sources in the process of processing the media data.

For example, synchronization of media data from different sources may be performed during data generation, post-processing (e.g., editing, mixing, etc.), transmission, playback, and the like.

Figure 27:
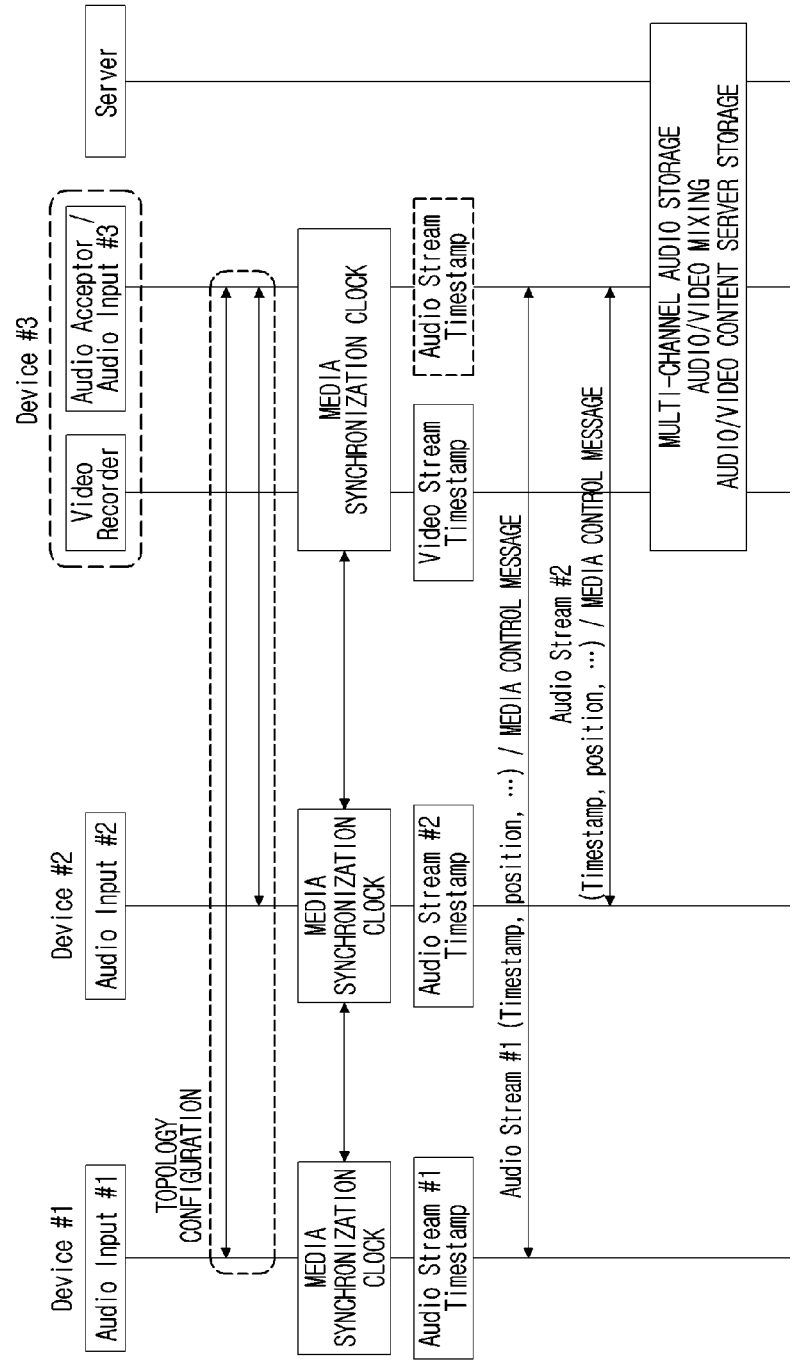
FIG. 27 is a diagram for describing a media data synchronization method based on a media synchronization clock to which the present disclosure may be applied.

FIG. 27 is a diagram for describing a media data synchronization method based on a media synchronization clock to which the present disclosure may be applied.

For example, the devices including audio inputs #1 and #2 may each be a wireless microphone device.

A video recorder and an audio acceptor may correspond to functional units included in one device. For example, a video recorder and an audio acceptor may be included in a smartphone or camera. Also, the audio acceptor may include audio input #3.

Device #1 including audio input #1, device #2 including audio input #2, and device #3 including video recorder and audio acceptor may constitute a network topology. For example, device #1 and device #3 may be paired. Also, device #2 and device #3 may be paired. Additionally, M audio inputs and N audio acceptors may establish a many-to-many (or M:N) pairing.

After the devices are paired with each other, the media synchronization clocks of each device may be synchronized. For example, an offset between internal clocks of each device may be checked, and a media synchronization clock synchronized in a plurality of devices may be configured based on this. For example, the clock of device #1 may have an offset of 625 us relative to device #3, and the clock of device #2 may have an offset of 1.25 ms relative to device #3. By reflecting each of these offsets, a synchronized media synchronization clock may be set between devices #1 to #3. Meanwhile, it is assumed that the video recorder and the audio acceptor (or audio input #3) included in one device #3 are synchronized with each other.

When the synchronized media synchronization clock is configured in a plurality of devices, each device may associate a timestamp based on the media synchronization clock with the media data it generates.

For example, the audio input #1 may include a timestamp in the audio stream #1 generated based on audio recorded at the location of the device #1. Audio input #2 may include a timestamp in audio stream #2 generated based on audio recorded at the location of device #2. The video recorder may include a timestamp in a video stream that is generated based on the video being recorded at the location of device #3. Audio input #3 may include a timestamp in audio stream #3 generated based on audio recorded at the location of device #3.

The device #1 may transmit the audio stream #1 including the timestamp to the audio acceptor of the device #3. Device #2 may transmit audio stream #2 including a timestamp to the audio acceptor of device #3. Accordingly, the audio acceptor may perform audio stream synchronization or alignment with respect to audio streams #1 and #2 delivered from different devices by using a timestamp value provided based on a media synchronization clock.

If device #3 generates audio stream #3 including timestamp, the audio acceptor may perform audio stream synchronization or alignment with respect to audio streams #1, #2, and #3 using a timestamp value provided based on a media synchronization clock.

Additionally, device #3 may perform audio stream synchronization or alignment with respect to the video stream generated by itself and the audio stream(s) generated by itself or delivered from an external device, using a timestamp value assigned based on a media synchronization clock.

Accordingly, media streams generated by different devices may be synchronized based on a timestamp value assigned based on a synchronized clock. That is, multi-channel audio may be synchronized and stored, audio and video mixing may be performed, and audio/video (A/V) content data generated in this way may be transmitted to and stored in a server.

In addition, as in the present disclosure, when a media synchronization clock between a plurality of devices is configured, a media control operation may be performed in synchronization based on this.

For example, when an operation of starting or resuming video or audio recording is performed in device #3, a control message indicating this may be transmitted to one or more of device #1 or #2. A message indicating a recording start or resume operation may include a timestamp value based on a media synchronization clock. Accordingly, at least one of device #1 or #2 receiving the message may start or resume audio recording at a time point indicated by a timestamp value.

Also, when the operation of pausing video or audio recording is performed in device #3, a control message indicating this may be transmitted to one or more of device #1 or #2. The message indicating the recording pause operation may include a timestamp value based on the media synchronization clock. Accordingly, at least one of device #1 or #2 receiving the message may pause audio recording at a time point indicated by a timestamp value.

Here, it may be assumed that the delay of exchanging media control messages between devices is very short compared to the delay of performing audio recording control in the device.

As such, even if a separate audio recording operation by the user is not performed on the device #1 or #2, the media control may be automatically performed on the device #1 or #2 by the user operation on the device #3.

As an additional example, location information of the device #1 may be included in the audio stream #1. Also, location information of device #2 may be included in audio stream #2. The location information of the device #1 or #2 may be information indicating an absolute location or information indicating a relative location with respect to the device #3.

This location information may be used for mixing a plurality of media streams generated by the audio acceptor itself or transmitted from outside. Accordingly, media data including location-based or audio object-based audio content may be generated.

For example, device #1 may be a microphone located to the right with respect to device #3, and device #2 may be a microphone located to the left with respect to device #3. Accordingly, when device #3 mixes a plurality of audio streams, audio stream #1 may be mapped to an audio object located at a left position of an image, and audio stream #2 may be mapped to an audio object located at a right position of an image. Accordingly, it may provide a sense of space to the viewer in reproducing the mixed A/V data.

In addition, even if the locations of devices #1 and #2 are changed in real time, since a timestamp based on the media synchronization clock is included in the media stream, it may be identified that audio streams #1 and #2 each contain audio data at a specific location at a specific time.

For example, one or more of a timestamp value or location information may be included in a payload of the media data or included in a header portion of the media data.

Figure 28:
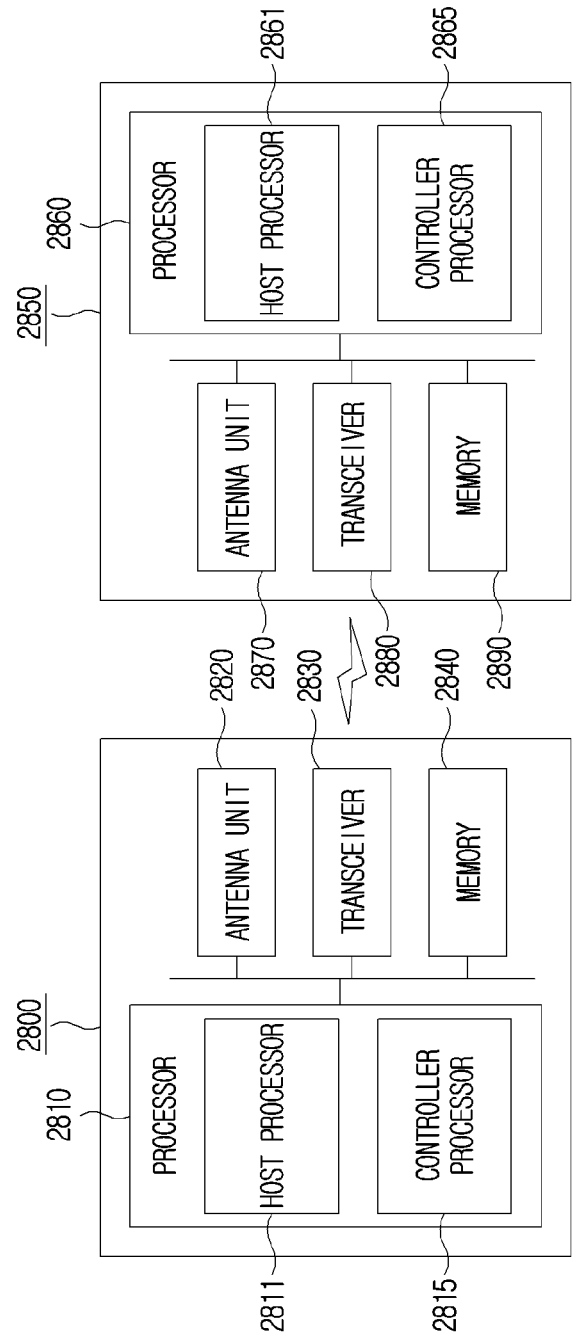
FIG. 28 is a diagram illustrating a configuration of a first device and a second device to which the present disclosure may be applied.

FIG. 28 is a diagram illustrating a configuration of a first device and a second device to which the present disclosure can be applied.

The first device 2800 may include a processor 2810, an antenna unit 2820, a transceiver 2830, and a memory 2840.

The processor 2810 may perform baseband-related signal processing and may include a host processing unit 2811 and a controller processing unit 2815. The host processing unit 2811 and the controller processing unit 2815 may exchange information through HCI. The host processing unit 2811 may process operations such as L2CAP, ATT, GATT, GAP, and LE profile layers. The controller processing unit 2815 may process operations such as LL and PHY layers. The processor 2810 may control the overall operation of the first device 2800 in addition to performing baseband-related signal processing.

Antenna unit 2820 may include one or more physical antennas. The transceiver 2830 may include RF (Radio Frequency) transmitter and RF receiver. The memory 2840 may store information processed by the processor 2810 and software, an operating system, and an application related to the operation of the first device 2800, and may include components such as a buffer and the like.

The processor 2810 of the first device 2800 may be configured to implement an operation of the first device (or, the audio source device, or client device) in the embodiments described in the present disclosure.

For example, the host processing unit 2811 of the processor 2810 of the first device 2800 (e.g., seeker device) may obtain credential information on the second device 2850 (e.g., provider device) from the server (e.g., account server or credential broker).

Also, the host processing unit 2811 may obtain a hash value based on the credential information included in the advertising packet of the second device 2850 through the controller processing unit 2815.

Also, the host processing unit 2811 may determine whether to establish a connection with the provider based on the credential information obtained from the server and the hash value obtained from the provider.

The second device 2850 may include a processor 2860, an antenna unit 2870, transceiver 2880, and a memory 2890.

The processor 2860 may perform baseband-related signal processing and may include a host processing unit 2861 and a controller processing unit 2865. The host processing unit 2861 and the controller processing unit 2865 may exchange information through HCI. The host processing unit 2861 may process operations such as L2CAP, ATT, GATT, GAP, and LE profile layers. The controller processing unit 2865 may process operations of the LL layer, the PHY layer, and the like. The processor 2860 may control the overall operation of the second device 2860 in addition to performing baseband-related signal processing.

The antenna unit 2870 may include one or more physical antennas. The transceiver 2880 may include an RF transmitter and an RF receiver. The memory 2890 may store information processed by the processor 2860 and software, an operating system, and an application related to the operation of the second device 2850, and may include components such as a buffer and the like.

The processor 2860 of the second terminal device 2850 may be configured to implement the operation of the second device (or audio sink, or server device) in the embodiments described in the present disclosure.

For example, when (updated) credential information is obtained from the first device 2800 (or seeker device), the host processing unit 2861 of the processor 2860 of the second device 2850 (or the provider device) may generate a hash value based on the corresponding credential information. Also, the host processing unit 2861 may transmit the generated hash value to the controller processing unit 2865 to be advertised through an advertising packet. Also, the host processing unit 2861 may establish a connection with the first device 2800 according to a connection request from the first device 2800.

The controller processing unit 2865 may advertise a general advertising packet that does not include the hash value when it does not retain the credential information.

In the operation of the first device 2800 and the second device 2850, in the examples of the present disclosure, the descriptions of the first device (or seeker device) and the second device (or provider device) may be equally applied, and overlapping descriptions will be omitted.

Various embodiments of the present disclosure may be implemented by hardware, firmware, software, or a combination thereof. For implementation by hardware, various embodiments of the present disclosure may be implemented one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), general purpose It may be implemented by a processor (general processor), a controller, a microcontroller, a microprocessor, and the like.

The scope of the present disclosure includes software or machine-executable instructions (e.g., operating system, application, firmware, program, etc.) that cause operation according to the method of various embodiments to be executed on a device or computer, and a non-transitory computer-readable medium in which such software or instructions are stored and executed on a device or computer. Instructions that may be used to program a processing system to perform the features described in this present disclosure may be stored on/in a storage medium or computer-readable storage medium, and features described in the present disclosure may be implemented using a computer program product including such the storage medium. The storage medium may include, but is not limited to, a high-speed random access memory such as DRAM, SRAM, DDR RAM or other random access solid state memory device, one or more magnetic disk storage devices, optical disk storage devices, flash memory devices, or may include non-volatile memory such as other non-volatile solid state storage devices. The memory optionally includes one or more storage devices located remotely from the processor(s). The memory or alternatively the non-volatile memory device(s) within the memory includes a non-transitory computer-readable storage medium. Features described in this present disclosure may be stored on any one of the machine readable media to control hardware of the processing system, and it may be incorporated into software and/or firmware that allows the processing system to interact with other mechanisms that utilize results in accordance with embodiments of the present disclosure. Such software or firmware may include, but is not limited to, application codes, device drivers, operating systems, and execution environments/containers.

INDUSTRIAL APPLICABILITY

Embodiments of the present disclosure may be applied to various wireless communication systems to increase the performance of the wireless communication system.

The invention claimed is:

1. A method for performing account-based pairing in a wireless communication system, the method comprising:
obtaining, by a second seeker device, credential information on a provider device,
wherein the credential information has been firstly created by a first seeker device and then shared by the first seeker device with a credential broker or a server,
wherein the credential broker or the server distributes the credential information directly to the second seeker device, and
wherein the first seeker device and the second seeker device are associated with a same user account;
obtaining, by the second seeker device, an advertising packet including a hash value of the credential information from the provider device,
wherein the credential information created by the first seeker device has been shared by the first seeker device with the provider device; and
establishing, by the second seeker device, a connection with the provider device based on the credential information obtained from the credential broker or the server and the hash value of the credential information obtained from the advertising packet.

2. The method of claim 1, wherein:
based on the credential information on the provider device obtained by the second seeker device from the credential broker or the server and credential information corresponding to the hash value being same, the second seeker device establishes a connection with the provider device.

3. The method of claim 1, wherein:
for a first-time connection between the first seeker device and the provider device,
if the advertising packet received by the first seeker device from the provider device does not include the hash value of the credential information,
when the first seeker device establishes a connection with the provider device, the first seeker device confirms whether the provider is a trusted device.

4. The method of claim 3, wherein:
if the provider device is a trusted device, the first seeker device transfers the credential information to the provider device.

5. The method of claim 4, wherein:
the advertising packet provided from the provider device includes a hash value of updated credential information provided from the first seeker device.

6. The method of claim 1, wherein:
the credential information includes at least one of:
information related to a user account associated with at least one of the first seeker device, the second seeker device, or the provider device;
information related to at least one of the credential broker or the server, the first seeker device, the second seeker device, or the provider device; or
information related to encryption between the first seeker device and the provider device, or between the second seeker device and the provider device.

7. The method of claim 1, wherein:
at least one of the first seeker device, the second seeker device, the provider device, or the credential broker or the server supports out of band (OOB) data exchange.

8. The method of claim 1, wherein:
the credential information is valid for a predetermined time.

9. A second seeker device side that performs account-based pairing in a wireless communication system, the second seeker device comprising:
a transceiver for performing signal transmission and reception with another apparatus; and
a processor for controlling the transceiver and the apparatus,
wherein the processor is configured to:
obtain, by the second seeker device, credential information on a provider device,
wherein the credential information has been firstly created by a first seeker device and then shared by the first seeker device with a credential broker or a server, wherein the credential broker or the server distributes the credential information directly to the second seeker device, and wherein the first seeker device and the second seeker device are associated with a same user account;

obtain, by the second seeker device, an advertising packet including a hash value of the credential information from the provider device, wherein the credential information created by the first seeker device has been shared by the first seeker device with the provider device; and establish, by the second seeker device, a connection with the provider device based on the credential information obtained from the credential broker or the server and the hash value of the credential information obtained from the advertising packet.

* * * * *